United States Patent
Xu et al.

(10) Patent No.: US 12,221,738 B2
(45) Date of Patent: Feb. 11, 2025

(54) OPERATION CONTROL METHOD AND SYSTEM FOR CLOTHING TREATMENT DEVICE, CLOTHING TREATMENT DEVICE, AND STORAGE MEDIUM

(71) Applicants: GUANGDONG WELLING MOTOR MANUFACTURING CO., LTD., Guangdong (CN); MIDEA WELLING MOTOR TECHNOLOGY (SHANGHAI) CO., LTD., Shanghai (CN)

(72) Inventors: Lei Xu, Guangdong (CN); Xiangnan Qin, Guangdong (CN); Junyong Fu, Guangdong (CN); Xiaoan Zhao, Guangdong (CN)

(73) Assignees: GUANGDONG WELLING MOTOR MANUFACTURING CO., LTD., Guangdong (CN); MIDEA WELLING MOTOR TECHNOLOGY (SHANGHAI) CO., LTD., Shanghai (CN)

( * ) Notice: Subject to any disclaimer, the term of this patent is extended or adjusted under 35 U.S.C. 154(b) by 1136 days.

(21) Appl. No.: 17/088,022

(22) Filed: Nov. 3, 2020

(65) Prior Publication Data
US 2021/0054554 A1   Feb. 25, 2021

Related U.S. Application Data

(63) Continuation of application No. PCT/CN2019/088859, filed on May 28, 2019.

(30) Foreign Application Priority Data

Jun. 14, 2018   (CN) .......................... 201810615370.4

(51) Int. Cl.
*D06F 33/48* (2020.01)
*G05B 19/416* (2006.01)
(Continued)

(52) U.S. Cl.
CPC .......... *D06F 33/48* (2020.02); *G05B 19/416* (2013.01); *D06F 2103/04* (2020.02);
(Continued)

(58) Field of Classification Search
CPC .. D06F 33/48; D06F 2103/04; D06F 2103/24; D06F 2103/26; D06F 2105/02;
(Continued)

(56) References Cited

U.S. PATENT DOCUMENTS 5,293,760 A * 3/1994 Tani ........................ D06F 34/18
68/12.02
5,475,291 A * 12/1995 Yoshida ............... G05B 19/409
318/632
(Continued)

FOREIGN PATENT DOCUMENTS

CN   101333747 A   12/2008
CN   102454085 A   5/2012
(Continued)

OTHER PUBLICATIONS

Machine translation of CN-104593996-A (Year: 2015).*
(Continued)

*Primary Examiner* — David G Cormier
*Assistant Examiner* — Thomas Bucci
(74) *Attorney, Agent, or Firm* — Scully, Scott, Murphy & Presser, P.C.

(57) ABSTRACT

An operation control method and system for a clothing treatment device having a drum and a motor is provided. Load inertia of the drum and a fluctuation parameter of the motor are obtained. Load eccentric mass of the clothing
(Continued)

treatment device is obtained based on the load inertia, the fluctuation parameter, and predetermined relationship data that is obtained based on pre-stored load inertia, torque fluctuation and load eccentric mass. The fluctuation parameter can be a torque fluctuation parameter or a rotation speed fluctuation parameter. The clothing treatment device can be controlled according to the load eccentric mass to optimize washing operations. For example, clothing and/or inlet water amount can be timely adjusted according to the calculated load eccentric mass. Thus, the clothing treatment device is prevented from producing significant noise during operations, and the service life of the clothing treatment device can be prolonged.

12 Claims, 13 Drawing Sheets

(51) Int. Cl.
    *D06F 103/04*     (2020.01)
    *D06F 103/24*     (2020.01)
    *D06F 103/26*     (2020.01)
    *D06F 105/02*     (2020.01)
    *D06F 105/48*     (2020.01)

(52) U.S. Cl.
    CPC ...... *D06F 2103/24* (2020.02); *D06F 2103/26* (2020.02); *D06F 2105/02* (2020.02); *D06F 2105/48* (2020.02); *G05B 2219/43132* (2013.01)

(58) Field of Classification Search
    CPC ............. D06F 2105/48; D06F 2103/38; D06F 2103/46; D06F 2105/52; D06F 2202/065; D06F 2202/10; D06F 2202/12; D06F 2204/065; D06F 2220/00; D06F 33/00; D06F 34/16; D06F 33/46; D06F 34/18; D06F 34/28; D06F 37/304; G05B 19/416; G05B 2219/43132
    USPC ........................................................ 68/12.04
    See application file for complete search history.

(56) References Cited

U.S. PATENT DOCUMENTS

| | | | | |
|---|---|---|---|---|
| 6,418,581 B1* | 7/2002 | Bruce | D06F 34/16 | 68/12.02 |
| 2004/0211009 A1* | 10/2004 | Murray | D06F 34/16 | 68/12.02 |
| 2005/0204482 A1* | 9/2005 | Murray | D06F 33/48 | 68/12.02 |
| 2005/0284192 A1* | 12/2005 | Altinier | D06F 33/40 | 68/23 R |
| 2006/0242768 A1* | 11/2006 | Zhang | D06F 34/16 | 68/12.04 |
| 2008/0289118 A1* | 11/2008 | Park | D06F 33/48 | 68/12.02 |
| 2009/0199598 A1* | 8/2009 | Kanazawa | D06F 34/18 | 700/275 |
| 2012/0324654 A1* | 12/2012 | Koo | D06F 33/32 | 68/12.12 |
| 2013/0152312 A1* | 6/2013 | Janke | D06F 33/48 | 68/12.02 |
| 2013/0160220 A1* | 6/2013 | Ashrafzadeh | D06F 33/48 | 68/12.16 |
| 2013/0160221 A1* | 6/2013 | Ashrafzadeh | D06F 33/48 | 68/12.04 |
| 2017/0145619 A1* | 5/2017 | Fugal | D06F 33/36 | |
| 2017/0145621 A1* | 5/2017 | Sumer | D06F 37/02 | |
| 2017/0250628 A1* | 8/2017 | Tian | H02P 21/14 | |
| 2018/0100260 A1 | 4/2018 | Jang et al. | | |
| 2019/0055689 A1* | 2/2019 | Pesavento | D06F 34/18 | |

FOREIGN PATENT DOCUMENTS

| | | | | |
|---|---|---|---|---|
| CN | 102828382 A | | 12/2012 | |
| CN | 103966799 A | * | 8/2014 | ........... D06F 37/203 |
| CN | 103966804 A | | 8/2014 | |
| CN | 104294533 A | | 1/2015 | |
| CN | 104593996 A | * | 5/2015 | ............. D06F 33/02 |
| CN | 105429549 A | | 3/2016 | |
| CN | 106702665 A | | 5/2017 | |
| CN | 107059326 A | | 8/2017 | |
| CN | 108547116 A | | 9/2018 | |
| CN | 108547117 A | | 9/2018 | |
| CN | 108755009 A | | 11/2018 | |
| CN | 108774849 A | | 11/2018 | |
| EP | 2009169 A2 | * | 12/2008 | ............. D06F 33/02 |
| KR | 1020070051572 A2 | | 5/2007 | |

OTHER PUBLICATIONS

Machine translation of CN-103966799-A (Year: 2014).*
International Search Report dated Aug. 27, 2019 received in International Patent Application No. PCT/ CN2019/088859 together with an English language translation.
First Office Action dated Feb. 25, 2020 received in Chinese Patent Application No. CN 201810615370.4 together with an English language translation.
Yu, J., "Engineering Mechanics", 3rd Edition, Aug. 31, 2016, pp. 86-87, Beijing Institute of Technology Press.
Say, M.G., "Alternating Current Machnes", Longman Scientific & Technical, Jan. 31, 2000, pp. 261-262.
Chen, D. et al., "A high precision algorithm of weight detection for washing machine", Appliance Science & Technology, Aug. 1, 2013, pp. 81-83.
Second Office Action dated Aug. 13, 2020 received in Chinese Patent Application No. CN 201810615370.4 together with an English language translation.
Notification of Reason for Refusal dated Nov. 11, 2021 received in Korean Patent Application No. KR 10-2020-7025146 together with an English language translation.

* cited by examiner

OPERATION CONTROL METHOD AND SYSTEM FOR CLOTHING TREATMENT DEVICE, CLOTHING TREATMENT DEVICE, AND STORAGE MEDIUM

CROSS-REFERENCES TO RELATED APPLICATIONS

The present application is continuation of PCT International Application No. PCT/CN2019/088859, filed on May 28, 2019, which claims priority to and benefits of Chinese Patent Application No. 201810615370.4, filed in the China National Intellectual Property Administration on Jun. 14, 2018, entitled "Operation Control Method and System for Clothing Treatment Device, Clothing Treatment Device, and Storage Medium", the entire contents of which are incorporated herein by reference for all purposes. No new matter has been introduced.

FIELD

The present application relates to the field of clothing treatment devices, and more particularly, to an operation control method for a clothing treatment device, an operation control system for a clothing treatment device, a clothing treatment device, and a computer-readable storage medium.

BACKGROUND

For an existing washing machine, the influence of load unbalance on the detection of the inertia is not considered. As a result, the obtained mass of clothing has a large error and cannot meet the requirements of users.

SUMMARY

The present application aims to solve at least one of the technical problems in the prior art or related art.

For this purpose, a first aspect of the present application is to provide an operation control method for a clothing treatment device.

A second aspect of the present application is to provide an operation control system for a clothing treatment device.

A third aspect of the present application is to provide a clothing treatment device.

A fourth aspect of the present application is to provide a computer-readable storage medium.

To this end, according to the first aspect of the present application, an operation control method for a clothing treatment device is provided, comprising: obtaining load inertia of a drum and torque fluctuation or speed fluctuation of a motor; obtaining load eccentric mass of the clothing treatment device according to the load inertia, the torque fluctuation, and predetermined relationship data based on pre-stored load inertia, pre-stored torque fluctuation, and pre-stored load eccentric mass; or obtaining load eccentric mass of the clothing treatment device according to the load inertia, the speed fluctuation, and predetermined relationship data based on pre-stored load inertia, pre-stored speed fluctuation, and pre-stored load eccentric mass; and controlling the clothing treatment device according to the load eccentric mass to adjust clothing.

According to the operation control method for the clothing treatment device provided by the application, after the load inertia of the drum and the torque fluctuation or speed fluctuation of the motor are obtained, based on the predetermined relationship data among storage load inertia, torque fluctuation, and load eccentric mass, an interval of the current load inertia and two corresponding fitted curves are determined according to the load inertia, then corresponding coordinate points on the two fitted curves are determined according to the torque fluctuation, and then an interval of the corresponding load eccentric mass is determined, optionally, the corresponding load eccentric mass is estimated according to the load inertia; or based on the predetermined relationship data among storage load inertia, speed fluctuation, and load eccentric mass, an interval of the current load inertia and two corresponding fitted curves are determined according to the load inertia, then corresponding coordinate points on the two fitted curves are determined according to the speed fluctuation, and then an interval of the corresponding load eccentric mass is determined, optionally, the corresponding load eccentric mass is estimated according to the load inertia; in this way, whether load unbalance occurs or not is accurately judged so as to timely adjust the clothing (for example, control the clothing treatment device to perform scattering operation) and/or adjust the inlet water amount, thereby preventing large noises generated in the operation process of the clothing treatment device, and prolonging the service life of the clothing treatment device.

In the above technical solution, optionally, the obtaining the load inertia of the drum comprises: controlling the motor of the clothing treatment device to perform a first operation process with a first acceleration, and integrating electromagnetic torque of the motor to obtain a first integration result; controlling the motor to perform a second operation process with a second acceleration, and integrating the electromagnetic torque of the motor to obtain a second integration result; acquiring operation parameters of the clothing treatment device, wherein the operation parameters at least include: a first operation period of the first operation process and speed values at two end points of the first operation process, and a second operation period of the second operation process and speed values at two end points of the second operation process; and calculating the load inertia of the motor according to the first integration result, the second integration result and the operation parameters.

In this technical solution, during the operation process of the clothing treatment device, the motor is controlled to perform the first operation process with the first acceleration, and the electromagnetic torque of the motor is integrated in the first operation process to obtain the first integration result; after the first operation process is finished, the motor is controlled to perform the second operation process with the second acceleration, and the electromagnetic torque of the motor is integrated in the second operation process to obtain the second integration result; the operation parameters of the clothing treatment device are acquired by statistics, wherein the operation parameters include, but are not limited to, the first operation period of the first operation process and the speed values at two end points of the first operation process, and the second operation period of the second operation process and the speed values at two end points of the second operation process; and the current load inertia of the motor is calculated according to the first integration result, the second integration result, the first operation period, the starting and ending times of the first operation period and the second operation period, and the speed values at the two end points of the first operation process and the second operation process, then the current mass of the clothing in the clothing treatment device is obtained according to the load inertia, and an appropriate water level and detergent amount are selected according to the mass of the clothing; in the method of the present application in which the mass of the clothing is determined by detecting the load inertia of the motor, the difference in friction of the drum of the clothing treatment device is taken into consideration, and the influence of load unbalance on the detection of the inertia is also considered, so that the detection accuracy of the mass of the clothing is improved, and water and electricity consumption are reduced, thereby reducing waste of resources; and as the first operation process and the second operation process are both acceleration processes, compared with a single acceleration or constant speed process, the time required for detecting the mass of the clothing is reduced, and the user experience is improved.

In the above technical solution, optionally, the load inertia is calculated with the following formula:

$$J = \frac{\frac{t_B - t_A}{t_D - t_C}\int_C^D T_{e2}dt - \int_A^B T_{e1}dt}{\frac{t_B - t_A}{t_D - t_C}(\omega_D - \omega_C) - (\omega_B - \omega_A)}$$

in the formula, J is the load inertia, and $t_A$, $t_B$, $t_C$, and $t_D$ are starting and ending times of the first operation period and the second operation period, respectively; $\omega_A$, $\omega_B$, $\omega_C$, and $\omega_D$ are the speed values at two end points of the first operation process and the second operation process, respectively, and $$\int_A^B T_{e1}dt \text{ and } \int_C^D T_{e2}dt$$

are the first integration result and the second integration result, respectively.

In the technical solution, the load inertia is directly calculated from the first integration result $$\int_A^B T_{e1}dt,$$

the second integration result $$\int_C^D T_{e2}dt,$$

the starting and ending times of the first operation period and the second operation period $t_A$, $t_B$, $t_C$, and $t_D$, and the speed values at two end points of the first operation process and the second operation process $\omega_A$, $\omega_B$, $\omega_C$, $\omega_D$ and without any complex calculation, wherein $T_{e1}$ is electromagnetic torque in the first operation period with $t_A$ as the starting time and $t_B$ as the ending time, and $T_{e2}$ is electromagnetic torque in the second operation period with $t_C$ as the starting time and $t_D$ as the ending time, wherein the numbers of cycles that the drum spins in the first operation period and the second operation period are integers.

In any of the above technical solutions, optionally, the obtaining the torque fluctuation comprises: detecting torque of the motor in real time in the first operation process or the second operation process; obtaining a detected maximum torque value and minimum torque value; and obtaining the torque fluctuation according to the maximum torque value and the minimum torque value.

In this technical solution, the torque of the motor is detected in real time in the first operation process or the second operation process, the maximum value and the minimum value of the torque are determined based on determination of the values of the torque, and then the difference between the maximum value and the minimum value is taken as the torque fluctuation; the torque of the drum of the clothing treatment device is detected after one cycle or N cycles, so that the calculated torque fluctuation can accurately characterize the actual torque fluctuation of the motor, and the situation that when the drum of the clothing treatment device does not spin complete cycles, the calculated torque fluctuation may be excessive large or small, by which the calculated eccentric mass may be excessive large or small and the result of judging whether load unbalance occurs or not is inaccurate, is prevented, thereby effectively preventing large noises generated in the operation process of the clothing treatment device and prolonging the service life of the clothing treatment device.

In any of the above technical solutions, optionally, the obtaining the speed fluctuation comprises: detecting current speed of the motor in real time in the first operation process or the second operation process; subjecting the current speed to high-pass filtering to obtain filtered first speed range information; and obtaining the speed fluctuation according to a maximum speed value and a minimum speed value in the first speed range information.

In this technical solution, the speed of the motor is detected in real time in the first operation process or the second operation process and subjected to high-pass filtering to filter out acceleration information of a low frequency band and to obtain the filtered first speed range information, and the maximum speed value and the minimum speed value in the first speed range information are compared so as to calculate a difference between the maximum speed value and the minimum speed value to obtain the speed fluctuation; the speed of the drum of the clothing treatment device is detected after one cycle or N cycles, so that the calculated speed fluctuation can accurately characterize the actual speed fluctuation of the motor, and the situation that when the drum of the clothing treatment device does not spin complete cycles, the calculated speed fluctuation may be excessive large or small, by which the calculated eccentric mass may be excessive large or small and the result of judging whether load unbalance occurs or not is inaccurate, is prevented, thereby effectively preventing large noises generated in the operation process of the clothing treatment device and prolonging the service life of the clothing treatment device.

In any of the above technical solutions, optionally, the first operation period and the second operation period are integral multiples of a spinning cycle of the drum of the drum of the clothing treatment device, and respective factors of the first operation period and the second operation period with respect to the spinning cycle are equal.

In this technical solution, the first operation period and the second operation period are integral multiples of the spinning cycle of the drum of the clothing treatment device, and the factors of the first operation period and the second operation period with respect to the spinning cycle are equal. If the first operation period is 4 spinning cycles of the drum, the second operation period is correspondingly also 4 spinning cycles of the drum, and by equaling the spinning cycles in the first operation period and the second operation period, it is ensured that the calculated load inertia is reliable to the most extent, and the determined mass of the clothing is therefore more accurate.

According to a second aspect of the present application, an operation control system for a clothing treatment device is provided, comprising: a memory for storing a computer program; and a processor for executing the computer program to: obtain load inertia of a drum and torque fluctuation or speed fluctuation of a motor; obtain load eccentric mass of the clothing treatment device according to the load inertia, the torque fluctuation, and pre-stored relationship data among storage load inertia, torque fluctuation, and load eccentric mass; or obtain load eccentric mass of the clothing treatment device according to the load inertia, the speed fluctuation, and pre-stored relationship data among storage load inertia, speed fluctuation, and load eccentric mass.

According to the operation control system for the clothing treatment device provided by the present application, the operation control system for the clothing treatment device comprises the memory for storing the computer program and the processor capable of executing the computer program; after the processor obtains the load inertia of the drum and the torque fluctuation or speed fluctuation of the motor, based on the stored relationship data among storage load inertia, torque fluctuation, and load eccentric mass, an interval of the current load inertia and two corresponding fitted curves are determined according to the load inertia, then corresponding coordinate points on the two fitted curves are determined according to the torque fluctuation, and then an interval of the corresponding load eccentric mass is determined, optionally, the corresponding load eccentric mass is estimated according to the load inertia; or based on the stored relationship data among storage load inertia, speed fluctuation, and load eccentric mass, an interval of the current load inertia and two corresponding fitted curves are determined according to the load inertia, then corresponding coordinate points on the two fitted curves are determined according to the speed fluctuation, and then an interval of the corresponding load eccentric mass is determined, optionally, the corresponding load eccentric mass is estimated according to the load inertia; in this way, whether load unbalance occurs or not is accurately judged so as to timely adjust the clothing and/or the inlet water amount, thereby preventing large noises generated in the operation process of the clothing treatment device, and prolonging the service life of the clothing treatment device.

In addition, the operation control system for the clothing treatment device in the above technical solution provided by the present application may further have the following additional technical features.

In the above technical solution, optionally, the processor is used for executing the computer program to: control the motor of the clothing treatment device to perform a first operation process with a first acceleration, and integrate electromagnetic torque of the motor to obtain a first integration result; control the motor to perform a second operation process with a second acceleration, and integrate the electromagnetic torque of the motor to obtain a second integration result; acquire operation parameters of the clothing treatment device, wherein the operation parameters at least include: a first operation period of the first operation process and speed values at two end points of the first operation process, and a second operation period of the second operation process and speed values at two end points of the second operation process; and calculate the load inertia of the motor according to the first integration result, the second integration result and the operation parameters.

In this technical solution, during the operation process of the clothing treatment device, the motor is controlled to perform the first operation process with the first acceleration, and the electromagnetic torque of the motor is integrated in the first operation process to obtain the first integration result; after the first operation process is finished, the motor is controlled to perform the second operation process with the second acceleration, and the electromagnetic torque of the motor is integrated in the second operation process to obtain the second integration result; the operation parameters of the clothing treatment device are acquired by statistics, wherein the operation parameters include, but are not limited to, the first operation period of the first operation process and the speed values at two end points of the first operation process, and the second operation period of the second operation process and the speed values at two end points of the second operation process; and the current load inertia of the motor is calculated according to the first integration result, the second integration result, the first operation period, the starting and ending times of the first operation period and the second operation period, and the speed values at the two end points of the first operation process and the second operation process, then the current mass of the clothing in the clothing treatment device is obtained according to the load inertia, and an appropriate water level and detergent amount are selected according to the mass of the clothing; in the method of the present application in which the mass of the clothing is determined by detecting the load inertia of the motor, the difference in friction of the drum of the clothing treatment device is taken into consideration, and the influence of load unbalance on the detection of the inertia is also considered, so that the detection accuracy of the mass of the clothing is improved, and water and electricity consumption are reduced, thereby reducing waste of resources; and as the first operation process and the second operation process are both acceleration processes, compared with a single acceleration or constant speed process, the time required for detecting the mass of the clothing is reduced, and the user experience is improved.

In the above technical solution, optionally, the processor is used for executing the computer program to: calculate the load inertia with the following formula:

$$J = \frac{\frac{t_B - t_A}{t_D - t_C} \int_C^D T_{e2} dt - \int_A^B T_{e1} dt}{\frac{t_B - t_A}{t_D - t_C}(\omega_D - \omega_C) - (\omega_B - \omega_A)}$$

in the formula, J is the load inertia, and $t_A$, $t_B$, $t_C$, and $t_D$ are starting and ending times of the first operation period and the second operation period, respectively; $\omega_A$, $\omega_B$, $\omega_C$, and $\omega_D$ and are the speed values at two end points of the first operation process and the second operation process, respectively, and $$\int_A^B T_{e1} dt \text{ and } \int_C^D T_{e2} dt$$

are the first integration result and the second integration result, respectively.

In the technical solution, the load inertia is directly calculated from the first integration result $$\int_A^B T_{e1} dt,$$

the second integration result $$\int_C^D T_{e2} dt,$$

the starting and ending times of the first operation period and the second operation period $t_A$, $t_B$, $t_C$, and $t_D$, and the speed values at two end points of the first operation process and the second operation process $\omega_A$, $\omega_B$, $\omega_C$, and $\omega_D$ without any complex calculation.

In any of the above technical solutions, optionally, the processor is used for executing the computer program to: detect torque of the motor in real time in the first operation process or the second operation process; obtain a detected maximum torque value and minimum torque value; and obtain the torque fluctuation according to the maximum torque value and the minimum torque value.

In this technical solution, the torque of the motor is detected in real time in the first operation process or the second operation process, the maximum value and the minimum value of the torque are determined based on determination of the values of the torque, and then the difference between the maximum value and the minimum value is taken as the torque fluctuation; the torque of the drum of the clothing treatment device is detected after one cycle or N cycles, so that the calculated torque fluctuation can accurately characterize the actual torque fluctuation of the motor, and the situation that when the drum of the clothing treatment device does not spin complete cycles, the calculated torque fluctuation may be excessive large or small, by which the calculated eccentric mass may be excessive large or small and the result of judging whether load unbalance occurs or not is inaccurate, is prevented, thereby effectively preventing large noises generated in the operation process of the clothing treatment device and prolonging the service life of the clothing treatment device.

In any of the above technical solutions, optionally, the processor is used for executing the computer program to: detect current speed of the motor in real time in the first operation process or the second operation process; subject the current speed to high-pass filtering to obtain filtered first speed range information; and obtain the speed fluctuation according to a maximum speed value and a minimum speed value in the first speed range information.

In this technical solution, the speed of the motor is detected in real time in the first operation process or the second operation process and subjected to high-pass filtering to filter out acceleration information of a low frequency band and to obtain the filtered first speed range information, and the maximum speed value and the minimum speed value in the first speed range information are compared so as to calculate a difference between the maximum speed value and the minimum speed value to obtain the speed fluctuation; the speed of the drum of the clothing treatment device is detected after one cycle or N cycles, so that the calculated speed fluctuation can accurately characterize the actual speed fluctuation of the motor, and the situation that when the drum of the clothing treatment device does not spin complete cycles, the calculated speed fluctuation may be excessive large or small, by which the calculated eccentric mass may be excessive large or small and the result of judging whether load unbalance occurs or not is inaccurate, is prevented, thereby effectively preventing large noises generated in the operation process of the clothing treatment device and prolonging the service life of the clothing treatment device.

In any of the above technical solutions, optionally, the first operation period and the second operation period are integral multiples of a spinning cycle of the drum of the clothing treatment device, and factors of the first operation period and the second operation period with respect to the spinning cycle are equal.

In this technical solution, the first operation period and the second operation period are integral multiples of the spinning cycle of the drum of the clothing treatment device, and the factors of the first operation period and the second operation period with respect to the spinning cycle are equal. If the first operation period is 4 spinning cycles of the drum, the second operation period is correspondingly also 4 spinning cycles of the drum, and by equaling the spinning cycles in the first operation period and the second operation period, it is ensured that the calculated load inertia is reliable to the most extent, and the determined mass of the clothing is therefore more accurate.

According to a third aspect of the present application, a clothing treatment device is provided, comprising the operation control system for the clothing treatment device according to any one of items described above.

The clothing treatment device provided by the application comprises the operation control system for the clothing treatment device according to any one of items described above, and has all the beneficial technical effects of the operation control system for the clothing treatment device and will not be described in detail herein.

According to a fourth aspect of the present application, a non-transitory computer-readable storage medium having stored thereon a computer program which, when executed by a processor, causes the processor to implement the method according to any one of the above technical solutions.

The non-transitory computer-readable storage medium provided by the present application has stored thereon the computer program which, when executed by the processor, carries out the method according to any one of the above technical solutions, and thus has all the beneficial technical effects of the operation control method for the clothing treatment device described above and will not be described in detail herein.

Additional aspects and advantages of the application will be set forth in part in the description which follows and, in part, will be obvious from the description, or may be learned by practice of the application.

BRIEF DESCRIPTION OF THE DRAWINGS

The above and/or additional aspects and advantages of the present application will become apparent and readily appreciated from the following description of the embodiments taken in conjunction with the accompanying drawings, in which.

DETAILED DESCRIPTION OF EMBODIMENTS

In order that the above aspects, features and advantages of the present application may be more clearly understood, the present application will be described in further detail with reference to the accompanying drawings and detailed description. It should be noted that the embodiments and features in the embodiments of the present application may be combined with one another without conflict.

In the following description, numerous specific details are set forth in order to provide a thorough understanding of the present application, but the application may be practiced otherwise than as described herein, and therefore, the scope of the application is not limited to the specific embodiments disclosed below.

An embodiment of the first aspect of the present application provides an operation control method for a clothing treatment device.

Figure 1:
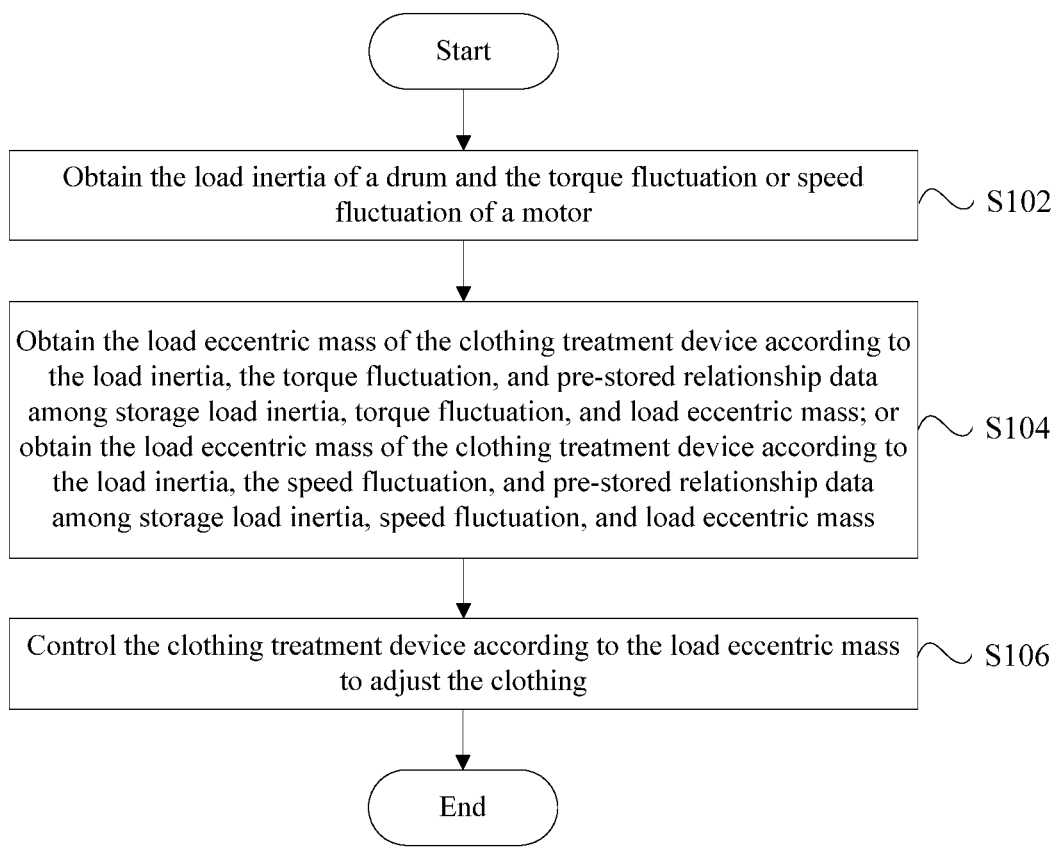
FIG. 1 shows a schematic flowchart illustrating an operation control method for a clothing treatment device according to an embodiment of the present application.

FIG. 1 shows a schematic flowchart illustrating an operation control method for a clothing treatment device according to an embodiment of the present application.

Figure 15:
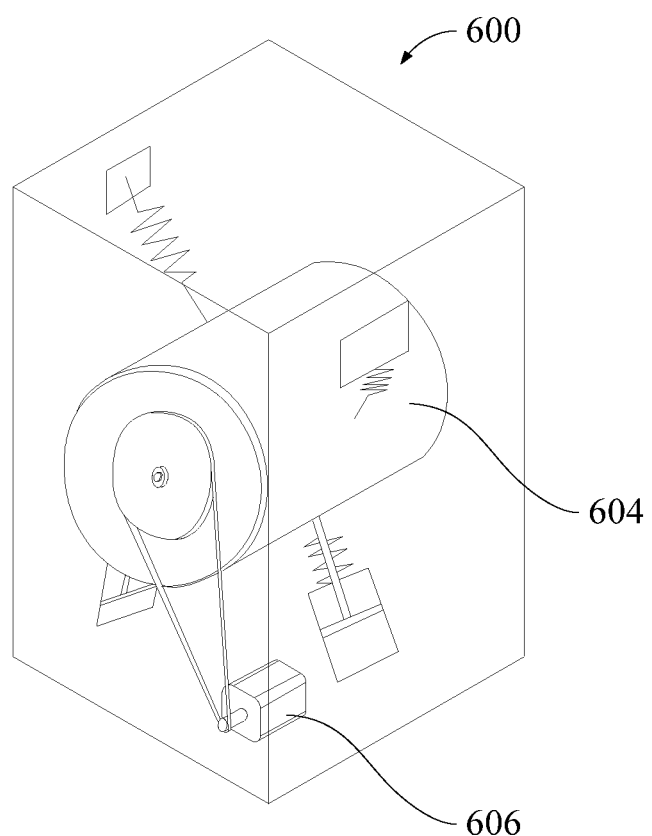
FIG. 15 shows a structural schematic view of the clothing treatment device according to an embodiment of the present application.

As shown in FIG. 1 and FIG. 15, the operation control method for the clothing treatment device 600 according to the embodiment of the present application comprises:

S102, load inertia of a drum and torque fluctuation or speed fluctuation of a motor are obtained;

S104, load eccentric mass of the clothing treatment device is obtained according to the load inertia, the torque fluctuation, and predetermined relationship data obtained based on pre-stored load inertia, pre-stored torque fluctuation, and pre-stored load eccentric mass; or load eccentric mass of the clothing treatment device is obtained according to the load inertia, the speed fluctuation, and predetermined relationship data obtained based on pre-stored load inertia, pre-stored speed fluctuation, and pre-stored load eccentric mass; and S106, the clothing treatment device is controlled according to the load eccentric mass to adjust clothing.

According to the operation control method for the clothing treatment device 600 provided by the present application, after the load inertia of the drum 604 and the torque fluctuation or speed fluctuation of the motor 606 are obtained, based on the stored relationship data among storage load inertia, torque fluctuation, and load eccentric mass, an interval of the current load inertia and two corresponding fitted curves are determined according to the load inertia, then corresponding coordinate points on the two fitted curves are determined according to the torque fluctuation, and then an interval of the corresponding load eccentric mass is determined, optionally, the corresponding load eccentric mass is estimated according to the load inertia; or based on the stored relationship data among storage load inertia, speed fluctuation, and load eccentric mass, an interval of the current load inertia and two corresponding fitted curves are determined according to the load inertia, then corresponding coordinate points on the two fitted curves are determined according to the speed fluctuation, and then an interval of the corresponding load eccentric mass is determined, optionally, the corresponding load eccentric mass is estimated according to the load inertia; in this way, whether load unbalance occurs or not is accurately judged so as to timely adjust the clothing (for example, control the clothing treatment device 600 to perform scattering operation) and/or adjust the inlet water amount, thereby preventing large noises generated in the operation process of the clothing treatment device 600, and prolonging the service life of the clothing treatment device 600.

Figure 2:
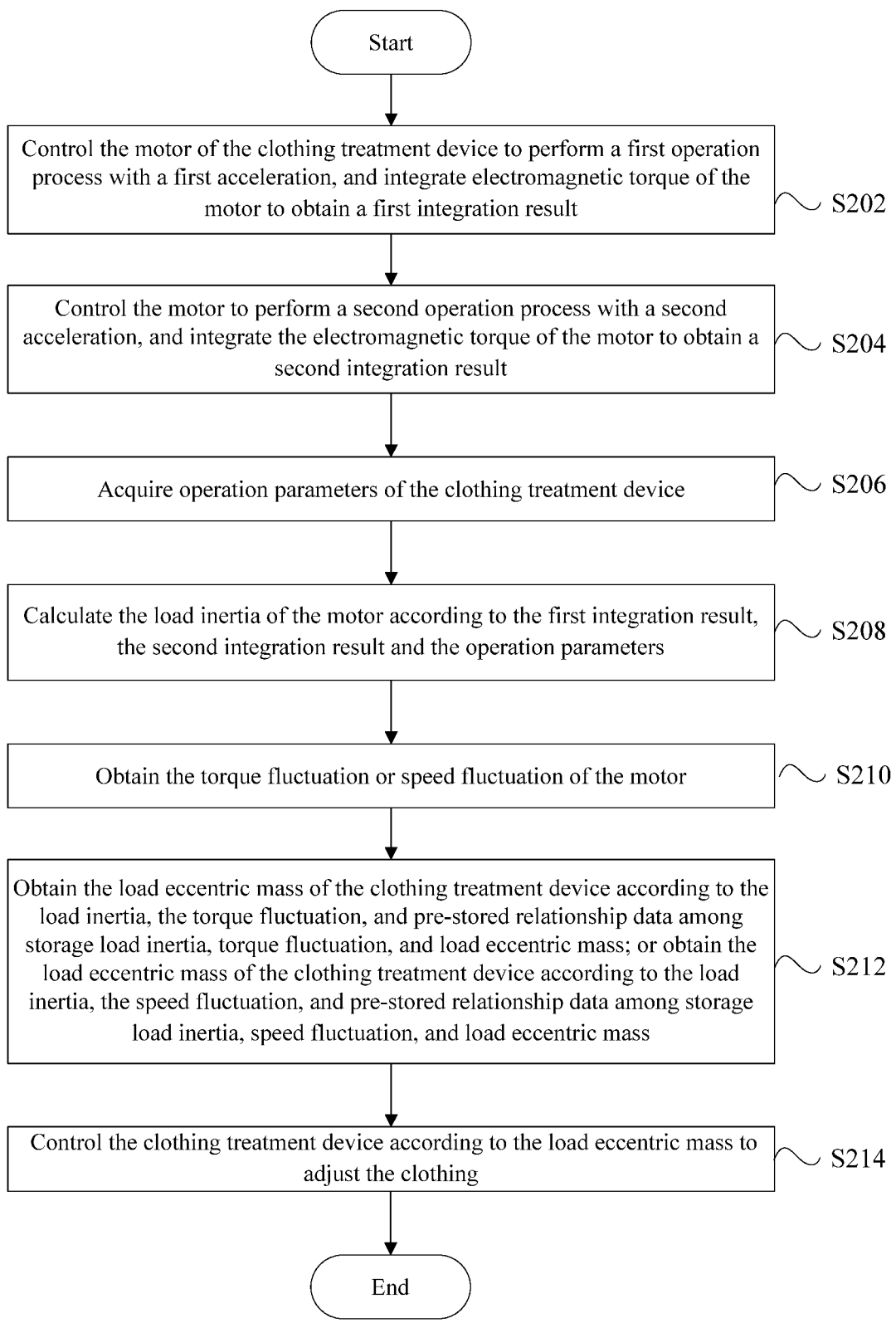
FIG. 2 shows a schematic flowchart elaborating certain aspects of the operation method of FIG. 1.

FIG. 2 shows a schematic flowchart illustrating an operation control method for a clothing treatment device.

As shown in FIG. 2, the operation control method for the clothing treatment device according to the embodiment of the present application comprises:

S202, the motor of the clothing treatment device is controlled to perform a first operation process with a first acceleration, and electromagnetic torque of the motor is integrated to obtain a first integration result;

S204, the motor is controlled to perform a second operation process with a second acceleration, and the electromagnetic torque of the motor is integrated to obtain a second integration result, wherein the second acceleration can be different from the first acceleration;

S206, operation parameters of the clothing treatment device are acquired; and

S208, the load inertia of the motor is obtained according to the first integration result, the second integration result and the operation parameters;

S210, the torque fluctuation or speed fluctuation of the motor are obtained;

S212, load eccentric mass of the clothing treatment device is obtained according to the load inertia, the torque fluctuation, and predetermined relationship data obtained based on pre-stored load inertia, pre-stored torque fluctuation, and pre-stored load eccentric mass; or load eccentric mass of the clothing treatment device is obtained according to the load inertia, the speed fluctuation, and predetermined relationship data obtained based on pre-stored load inertia, pre-stored speed fluctuation, and pre-stored load eccentric mass; and S214, the clothing treatment device is controlled according to the load eccentric mass to adjust clothing.

Among others, the operation parameters at least include: a first operation period of the first operation process and speed values at two end points of the first operation process, and a second operation period of the second operation process and speed values at two end points of the second operation process.

In this embodiment, during the operation process of the clothing treatment device 600, the motor 606 is controlled to perform the first operation process with the first acceleration, and the electromagnetic torque of the motor 606 is integrated in the first operation process to obtain the first integration result; after the first operation process is finished, the motor 606 is controlled to perform the second operation process with the second acceleration, and the electromagnetic torque of the motor 606 is integrated in the second operation process to obtain the second integration result; the operation parameters of the clothing treatment device 600 are acquired by statistics, wherein the operation parameters include, but are not limited to, the first operation period of the first operation process and the speed values at two end points of the first operation process, and the second operation period of the second operation process and the speed values at two end points of the second operation process; and the current load inertia of the motor 606 is calculated according to the first integration result, the second integration result, the first operation period, the starting and ending times of the first operation period and the second operation period, and the speed values at the two end points of the first operation process and the second operation process, then the current mass of the clothing in the clothing treatment device 600 is obtained according to the load inertia, and an appropriate water level and detergent amount are selected according to the mass of the clothing; in the method of the present application in which the mass of the clothing is determined by detecting the load inertia of the motor 606, the difference in friction of the drum 604 of the clothing treatment device 600 is taken into consideration, and the influence of load unbalance on the detection of the inertia is also considered, so that the detection accuracy of the mass of the clothing is improved, and water and electricity consumption are reduced, thereby reducing waste of resources; and as the first operation process and the second operation process are both acceleration processes, compared with a single acceleration or constant speed process, the time required for detecting the mass of the clothing is reduced, and the user experience is improved.

In one embodiment of the present application, the load inertia is calculated with the following formula:

$$J = \frac{\frac{t_B - t_A}{t_D - t_C} \int_C^D T_{e2} dt - \int_A^B T_{e1} dt}{\frac{t_B - t_A}{t_D - t_C}(\omega_D - \omega_C) - (\omega_B - \omega_A)}$$

in the formula, J is the load inertia, and $t_A$, $t_B$, $t_C$, and $t_D$ are starting and ending times of the first operation period and the second operation period, respectively; $\omega_A$, $\omega_B$, $\omega_C$, and $\omega_D$ are the speed values at two end points of the first operation process and the second operation process, respectively, and $$\int_A^B T_{e1} dt \text{ and } \int_C^D T_{e2} dt$$

are the first integration result and the second integration result, respectively.

In the technical solution, the load inertia J is directly calculated from the first integration result $$\int_A^B T_{e1} dt,$$

the second integration result $$\int_C^D T_{e2} dt,$$

the starting and ending times of the first operation period and the second operation period $t_A$, $t_B$, $t_C$, and $t_D$, and the speed values at two end points of the first operation process and the second operation process $\omega_A$, $\omega_B$, $\omega_C$, and $\omega_D$ without any complex calculation.

Figure 3:
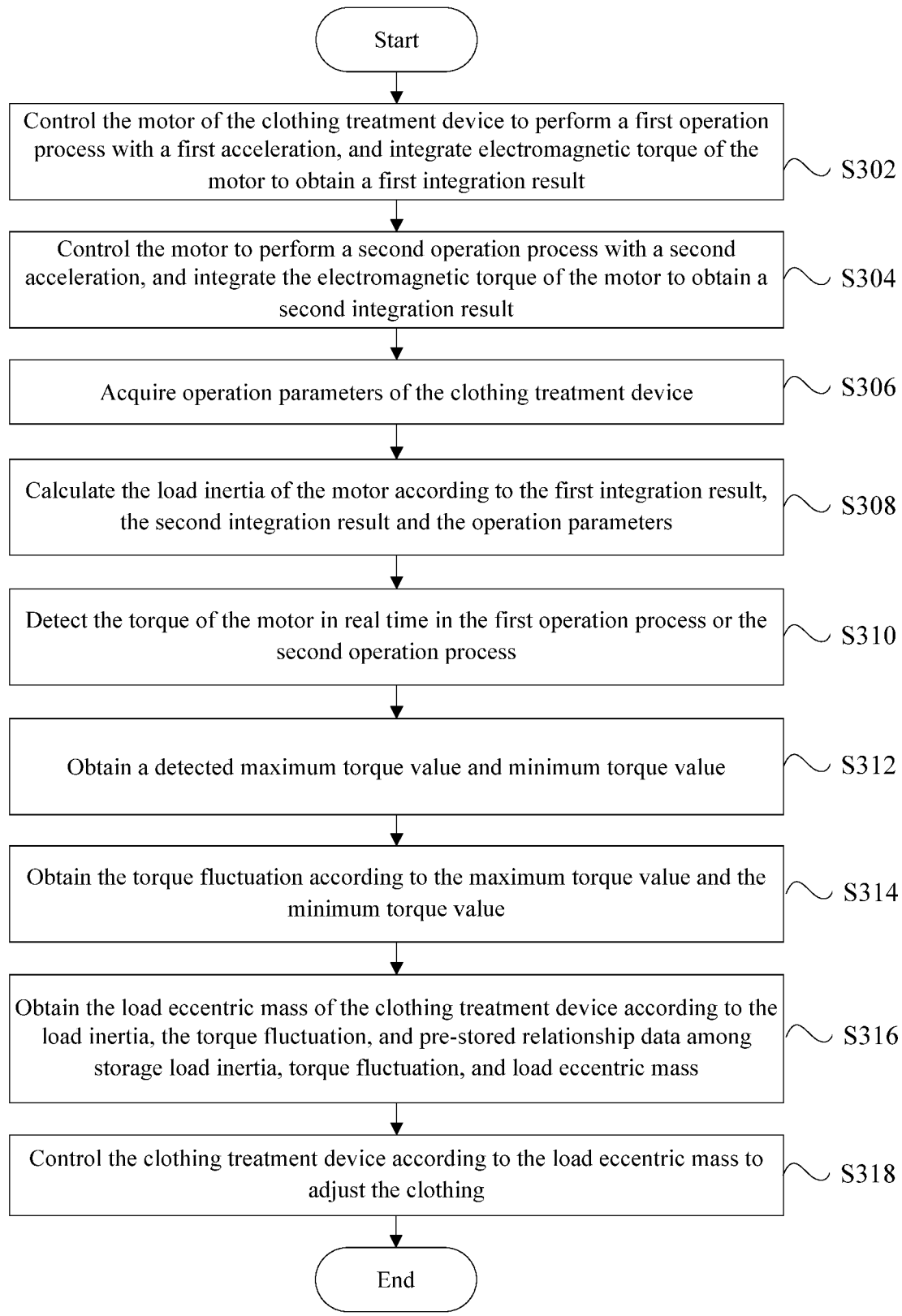
FIG. 3 shows a schematic flowchart elaborating certain aspects of the operation method of FIG. 1.

FIG. 3 shows a schematic flowchart illustrating an operation control method for a clothing treatment device.

As shown in FIG. 3, the operation control method for the clothing treatment device according to the embodiment of the present application comprises:

S302, the motor of the clothing treatment device is controlled to perform a first operation process with a first acceleration, and electromagnetic torque of the motor is integrated to obtain a first integration result;

S304, the motor is controlled to perform a second operation process with a second acceleration, and the electromagnetic torque of the motor is integrated to obtain a second integration result;

S306, operation parameters of the clothing treatment device are acquired;

S308, the load inertia of the motor is obtained according to the first integration result, the second integration result and the operation parameters;

S310, torque of the motor is detected in real time in the first operation process or the second operation process;

S312, a detected maximum torque value and minimum torque value are obtained;

S314, the torque fluctuation is obtained according to the maximum torque value and the minimum torque value;

S316, load eccentric mass of the clothing treatment device is obtained according to the load inertia, the torque fluctuation, and predetermined relationship data obtained based on pre-stored load inertia, pre-stored torque fluctuation, and pre-stored load eccentric mass; and S318, the clothing treatment device is controlled according to the load eccentric mass to adjust clothing.

In this embodiment, the torque of the motor 606 is detected in real time in the first operation process or the second operation process, the maximum value and the minimum value of the torque are determined based on determination of the values of the torque, and then the difference between the maximum value and the minimum value is taken as the torque fluctuation; the torque of the drum 604 of the clothing treatment device 600 is detected after one cycle or N cycles, so that the calculated torque fluctuation can accurately characterize the actual torque fluctuation of the motor 606, and the situation that when the drum 604 of the clothing treatment device 600 does not spin complete cycles, the calculated torque fluctuation may be excessive large or small, by which the calculated eccentric mass may be excessive large or small and the result of judging whether load unbalance occurs or not is inaccurate, is prevented, thereby effectively preventing large noises generated in the operation process of the clothing treatment device 600 and prolonging the service life of the clothing treatment device 600.

Figure 4:
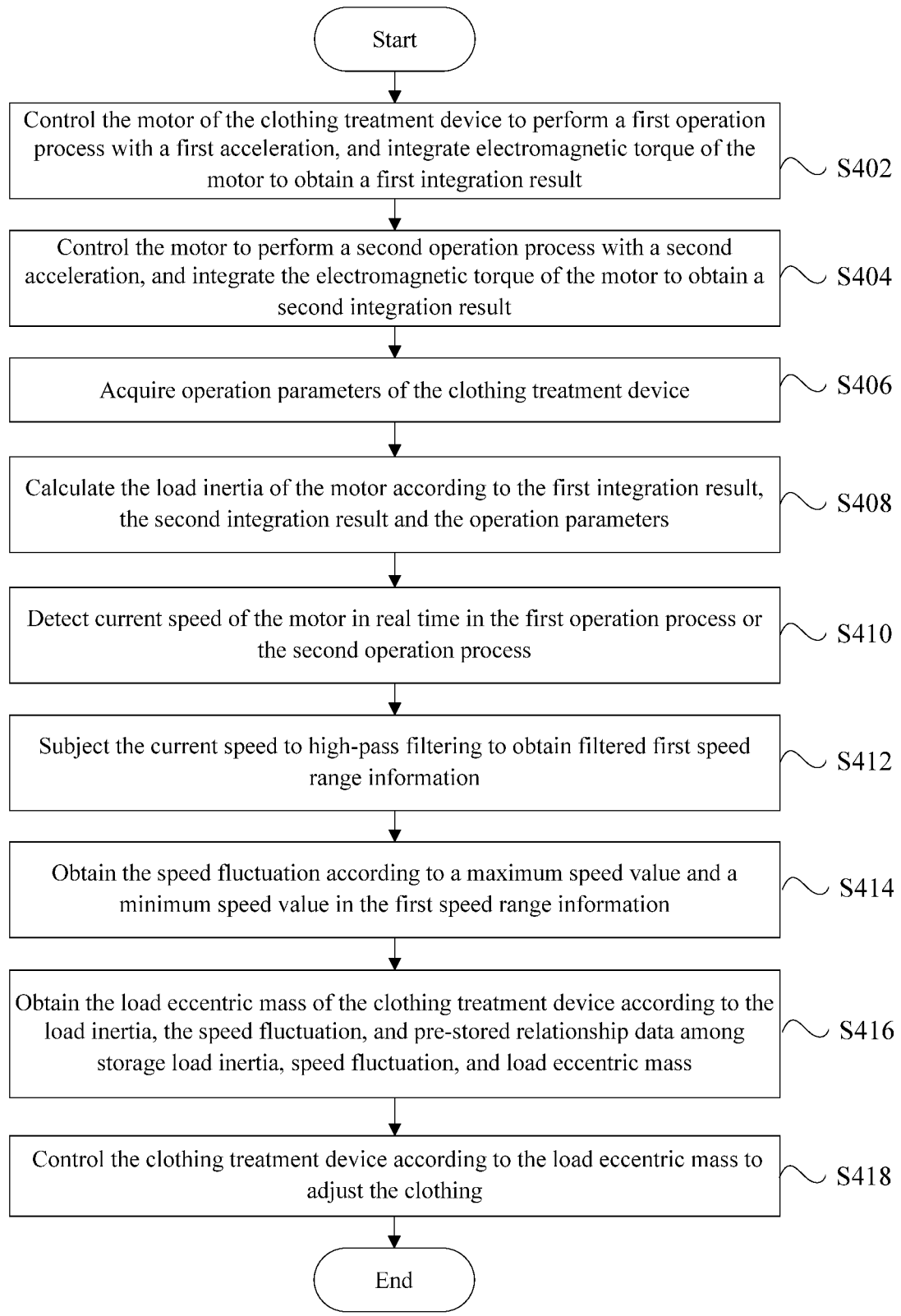
FIG. 4 shows a schematic flowchart elaborating certain aspects of the operation method of FIG. 1.

FIG. 4 shows a schematic flowchart illustrating an operation control method for a clothing treatment device.

As shown in FIG. 4, the operation control method for the clothing treatment device according to the embodiment of the present application comprises:

S402, the motor of the clothing treatment device is controlled to perform a first operation process with a first acceleration, and electromagnetic torque of the motor is integrated to obtain a first integration result;

S404, the motor is controlled to perform a second operation process with a second acceleration, and the electromagnetic torque of the motor is integrated to obtain a second integration result;

S406, operation parameters of the clothing treatment device are acquired;

S408, the load inertia of the motor is obtained according to the first integration result, the second integration result and the operation parameters;

S410, current speed of the motor is detected in real time in the first operation process or the second operation process;

S412, the current speed is subjected to high-pass filtering to obtain filtered first speed range information;

S414, the speed fluctuation is obtained according to a maximum speed value and a minimum speed value in the first speed range information;

S416, load eccentric mass of the clothing treatment device is obtained according to the load inertia, the speed fluctuation, and predetermined relationship data obtained based on pre-stored load inertia, pre-stored speed fluctuation, and pre-stored load eccentric mass; and S418, the clothing treatment device is controlled according to the load eccentric mass to adjust clothing.

In this embodiment, the speed of the motor 606 is detected in real time in the first operation process or the second operation process and subjected to high-pass filtering to filter out acceleration information of a low frequency band and to obtain the filtered first speed range information, and the maximum speed value and the minimum speed value in the first speed range information are compared so as to calculate a difference between the maximum speed value and the minimum speed value to obtain the speed fluctuation; the speed of the drum 604 of the clothing treatment device 600 is detected after one cycle or N cycles, so that the calculated speed fluctuation can accurately characterize the actual speed fluctuation of the motor 606, and the situation that when the drum 604 of the clothing treatment device 600 does not spin complete cycles, the calculated speed fluctuation may be excessive large or small, by which the calculated eccentric mass may be excessive large or small and the result of judging whether load unbalance occurs or not is inaccurate, is prevented, thereby effectively preventing large noises generated in the operation process of the clothing treatment device 600 and prolonging the service life of the clothing treatment device 600.

In one embodiment of the present application, the first operation period and the second operation period are integral multiples of a spinning cycle of the drum 604 of the clothing treatment device 600, and factors of the first operation period and the second operation period with respect to the spinning cycle are equal.

In this embodiment, the first operation period and the second operation period are integral multiples of the spinning cycle of the drum 604 of the clothing treatment device 600, and the factors of the first operation period and the second operation period with respect to the spinning cycle are equal. If the first operation period is 4 spinning cycles of the drum 604, the second operation period is correspondingly also 4 spinning cycles of the drum 604, and by equaling the spinning cycles in the first operation period and the second operation period, it is ensured that the calculated load inertia is reliable to the most extent, and the determined mass of the clothing is therefore more accurate.

An embodiment of the second aspect of the present application provides an operation control system for a clothing treatment device.

Figure 5:
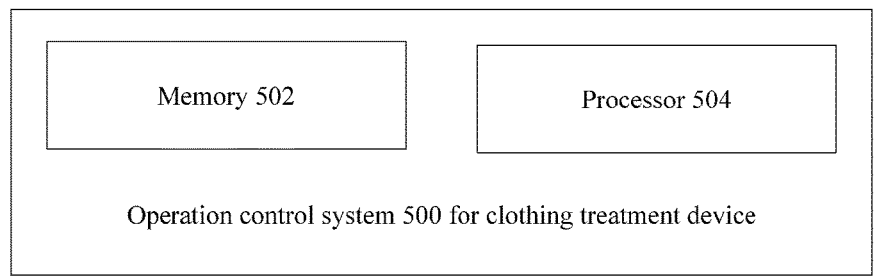
FIG. 5 shows a schematic block diagram illustrating an operation control system for a clothing treatment device according to an embodiment of the present application.

FIG. 5 shows a schematic block diagram illustrating an operation control system for a clothing treatment device according to an embodiment of the present application.

As shown in FIG. 5, the operation control system 500 of the clothing treatment device according to the embodiment of the present application comprises:

a memory 502 for storing a computer program; and a processor 504 configured to execute the computer program to:

obtain load inertia of a drum and torque fluctuation or speed fluctuation of a motor; obtain load eccentric mass of the clothing treatment device according to the load inertia, the torque fluctuation, and predetermined relationship data obtained based on pre-stored load inertia, pre-stored torque fluctuation, and pre-stored load eccentric mass; or obtain load eccentric mass of the clothing treatment device according to the load inertia, the speed fluctuation, and predetermined relationship data obtained based on pre-stored load inertia, pre-stored speed fluctuation, and pre-stored load eccentric mass; and control the clothing treatment device according to the load eccentric mass to adjust clothing.

According to the operation control system for the clothing treatment device provided by the present application, the operation control system for the clothing treatment device comprises the memory for storing the computer program and the processor capable of executing the computer program; after the processor obtains the load inertia of the drum and the torque fluctuation or speed fluctuation of the motor, based on the stored relationship data among storage load inertia, torque fluctuation, and load eccentric mass, an interval of the current load inertia and two corresponding fitted curves are determined according to the load inertia, then corresponding coordinate points on the two fitted curves are determined according to the torque fluctuation, and then an interval of the corresponding load eccentric mass is determined, optionally, the corresponding load eccentric mass is estimated according to the load inertia; or based on the stored relationship data among storage load inertia, speed fluctuation, and load eccentric mass, an interval of the current load inertia and two corresponding fitted curves are determined according to the load inertia, then corresponding coordinate points on the two fitted curves are determined according to the speed fluctuation, and then an interval of the corresponding load eccentric mass is determined, optionally, the corresponding load eccentric mass is estimated according to the load inertia; in this way, whether load unbalance occurs or not is accurately judged so as to timely adjust the clothing (for example, control the clothing treatment device to perform scattering operation) and/or adjust the inlet water amount, thereby preventing large noises generated in the operation process of the clothing treatment device, and prolonging the service life of the clothing treatment device.

Optionally, the processor 504 is used for executing the computer program to: control the motor of the clothing treatment device to perform a first operation process with a first acceleration, and integrate electromagnetic torque of the motor to obtain a first integration result; control the motor to perform a second operation process with a second acceleration, and integrate the electromagnetic torque of the motor to obtain a second integration result; acquire operation parameters of the clothing treatment device, wherein the operation parameters at least include: a first operation period of the first operation process and speed values at two end points of the first operation process, and a second operation period of the second operation process and speed values at two end points of the second operation process; and calculate the load inertia of the motor according to the first integration result, the second integration result and the operation parameters.

In this embodiment, during the operation process of the clothing treatment device, the motor is controlled to perform the first operation process with the first acceleration, and the electromagnetic torque of the motor is integrated in the first operation process to obtain the first integration result; after the first operation process is finished, the motor is controlled to perform the second operation process with the second acceleration, and the electromagnetic torque of the motor is integrated in the second operation process to obtain the second integration result; the operation parameters of the clothing treatment device are acquired by statistics, wherein the operation parameters include, but are not limited to, the first operation period of the first operation process and the speed values at two end points of the first operation process, and the second operation period of the second operation process and the speed values at two end points of the second operation process; and the current load inertia of the motor is calculated according to the first integration result, the second integration result, the first operation period, the starting and ending times of the first operation period and the second operation period, and the speed values at the two end points of the first operation process and the second operation process, then the current mass of the clothing in the clothing treatment device is obtained according to the load inertia, and an appropriate water level and detergent amount are selected according to the mass of the clothing; in the method of the present application in which the mass of the clothing is determined by detecting the load inertia of the motor, the difference in friction of the drum of the clothing treatment device is taken into consideration, and the influence of load unbalance on the detection of the inertia is also considered, so that the detection accuracy of the mass of the clothing is improved, and water and electricity consumption are reduced, thereby reducing waste of resources; and as the first operation process and the second operation process are both acceleration processes, compared with a single acceleration or constant speed process, the time required for detecting the mass of the clothing is reduced, and the user experience is improved.

Optionally, the processor 504 is used for executing the computer program to: calculate the load inertia with the following formula:

$$J = \frac{\frac{t_B - t_A}{t_D - t_C} \int_C^D T_{e2} dt - \int_A^B T_{e1} dt}{\frac{t_B - t_A}{t_D - t_C}(\omega_D - \omega_C) - (\omega_B - \omega_A)}$$

in the formula, J is the load inertia, and $t_A$, $t_B$, $t_C$, and $t_D$ are starting and ending times of the first operation period and the second operation period, respectively; $\omega_A$, $\omega_B$, $\omega_C$, and $\omega_D$ and are the speed values at two end points of the first operation process and the second operation process, respectively, and $$\int_A^B T_{e1} dt \text{ and } \int_C^D T_{e2} dt$$

A and C are the first integration result and the second integration result, respectively.

In this embodiment, the load inertia J is directly calculated from the first integration result $$\int_A^B T_{e1} dt,$$

the second integration result $$\int_C^D T_{e2} dt,$$

the starting and ending times of the first operation period and the second operation period, $t_A$, $t_B$, $t_C$, and $t_D$, and the speed values at two end points of the first operation process and the second operation process $\omega_A$, $\omega_B$, $\omega_C$, and $\omega_D$ without any complex calculation.

Optionally, the processor 504 is used for executing the computer program to: detect torque of the motor in real time in the first operation process or the second operation process; obtain a detected maximum torque value and minimum torque value; and obtain the torque fluctuation according to the maximum torque value and the minimum torque value.

In this embodiment, the torque of the motor is detected in real time in the first operation process or the second operation process, the maximum value and the minimum value of the torque are determined based on determination of the values of the torque, and then the difference between the maximum value and the minimum value is taken as the torque fluctuation; the torque of the drum of the clothing treatment device is detected after one cycle or N cycles, so that the calculated torque fluctuation can accurately characterize the actual torque fluctuation of the motor, and the situation that when the drum of the clothing treatment device does not spin complete cycles, the calculated torque fluctuation may be excessive large or small, by which the calculated eccentric mass may be excessive large or small and the result of judging whether load unbalance occurs or not is inaccurate, is prevented, thereby effectively preventing large noises generated in the operation process of the clothing treatment device and prolonging the service life of the clothing treatment device.

Optionally, the processor 504 is used for executing the computer program to: detect current speed of the motor in real time in the first operation process or the second operation process; subject the current speed to high-pass filtering to obtain filtered first speed range information; and obtain the speed fluctuation according to a maximum speed value and a minimum speed value in the first speed range information.

In this embodiment, the speed of the motor is detected in real time in the first operation process or the second operation process and subjected to high-pass filtering to filter out acceleration information of a low frequency band and to obtain the filtered first speed range information, and the maximum speed value and the minimum speed value in the first speed range information are compared so as to calculate a difference between the maximum speed value and the minimum speed value to obtain the speed fluctuation; the speed of the drum of the clothing treatment device is detected after one cycle or N cycles, so that the calculated speed fluctuation can accurately characterize the actual speed fluctuation of the motor, and the situation that when the drum of the clothing treatment device does not spin complete cycles, the calculated speed fluctuation may be excessive large or small, by which the calculated eccentric mass may be excessive large or small and the result of judging whether load unbalance occurs or not is inaccurate, is prevented, thereby effectively preventing large noises generated in the operation process of the clothing treatment device and prolonging the service life of the clothing treatment device.

Optionally, the first operation period and the second operation period are integral multiples of a spinning cycle of the drum of the clothing treatment device, and factors of the first operation period and the second operation period with respect to the spinning cycle are equal.

In this embodiment, the first operation period and the second operation period are integral multiples of the spinning cycle of the drum of the clothing treatment device, and the factors of the first operation period and the second operation period with respect to the spinning cycle are equal. If the first operation period is 4 spinning cycles of the drum, the second operation period is correspondingly also 4 spinning cycles of the drum, and by equaling the spinning cycles in the first operation period and the second operation period, it is ensured that the calculated load inertia is reliable to the most extent, and the determined mass of the clothing is therefore more accurate.

An embodiment of the third aspect of the present application provides a clothing treatment device.

Figure 6:
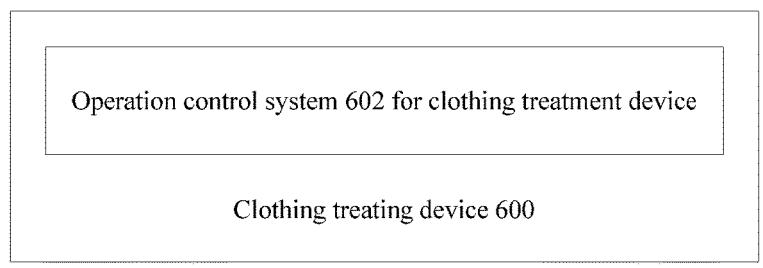
FIG. 6 shows a schematic block diagram illustrating a clothing treatment device according to an embodiment of the present application.

FIG. 6 shows a schematic block diagram illustrating a clothing treatment device 600 according to an embodiment of the present application.

As shown in FIG. 6, the clothing treatment device 600 according to the embodiment of the present application comprises: an operation control system 602 for the clothing treatment device.

The clothing treatment device 600 provided by the present application comprises the operation control system 602 for the clothing treatment device, and the operation control system 602 for the clothing treatment device has all the technical effects of the operation control system for the clothing treatment device described above, therefore, the clothing treatment device 600 also has all the technical effects of the operation control system for the clothing treatment device described above and will not be described in detail herein.

An embodiment of the fourth aspect of the present application provides a computer-readable storage medium having stored thereon a computer program which, when executed by a processor, performs the method as described in any of the above technical solutions.

The computer-readable storage medium provided by the present application has stored thereon the computer program which, when executed by the processor, carries out the method according to any one of the above technical solutions, and thus has all the beneficial technical effects of the operation control method for the clothing treatment device described above and will not be described in detail herein.

Figure 7:
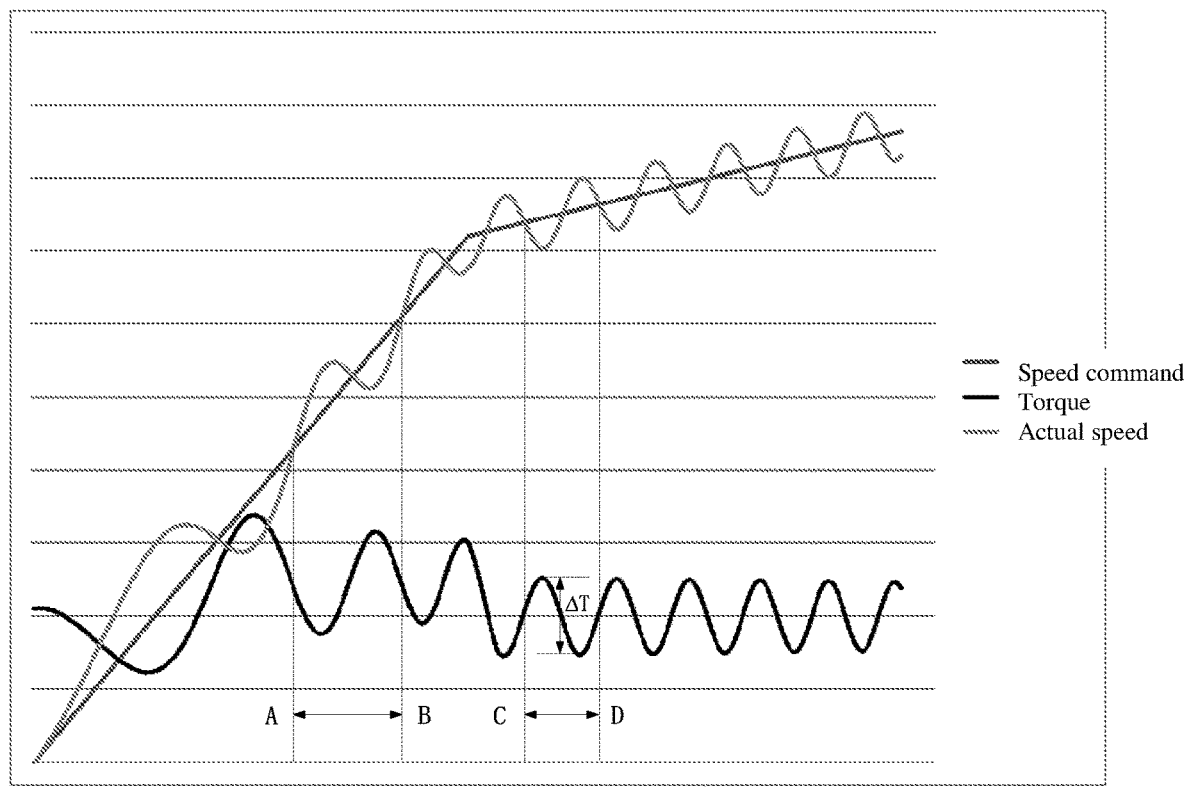
FIG. 7 shows a diagram illustrating a relationship among the actual speed, command speed, and torque of a drum washing machine according to an embodiment of the present application.

FIG. 7 shows a diagram illustrating a relationship among the actual speed, command speed, and torque of a drum washing machine according to an embodiment of the present application.

Figure 8:
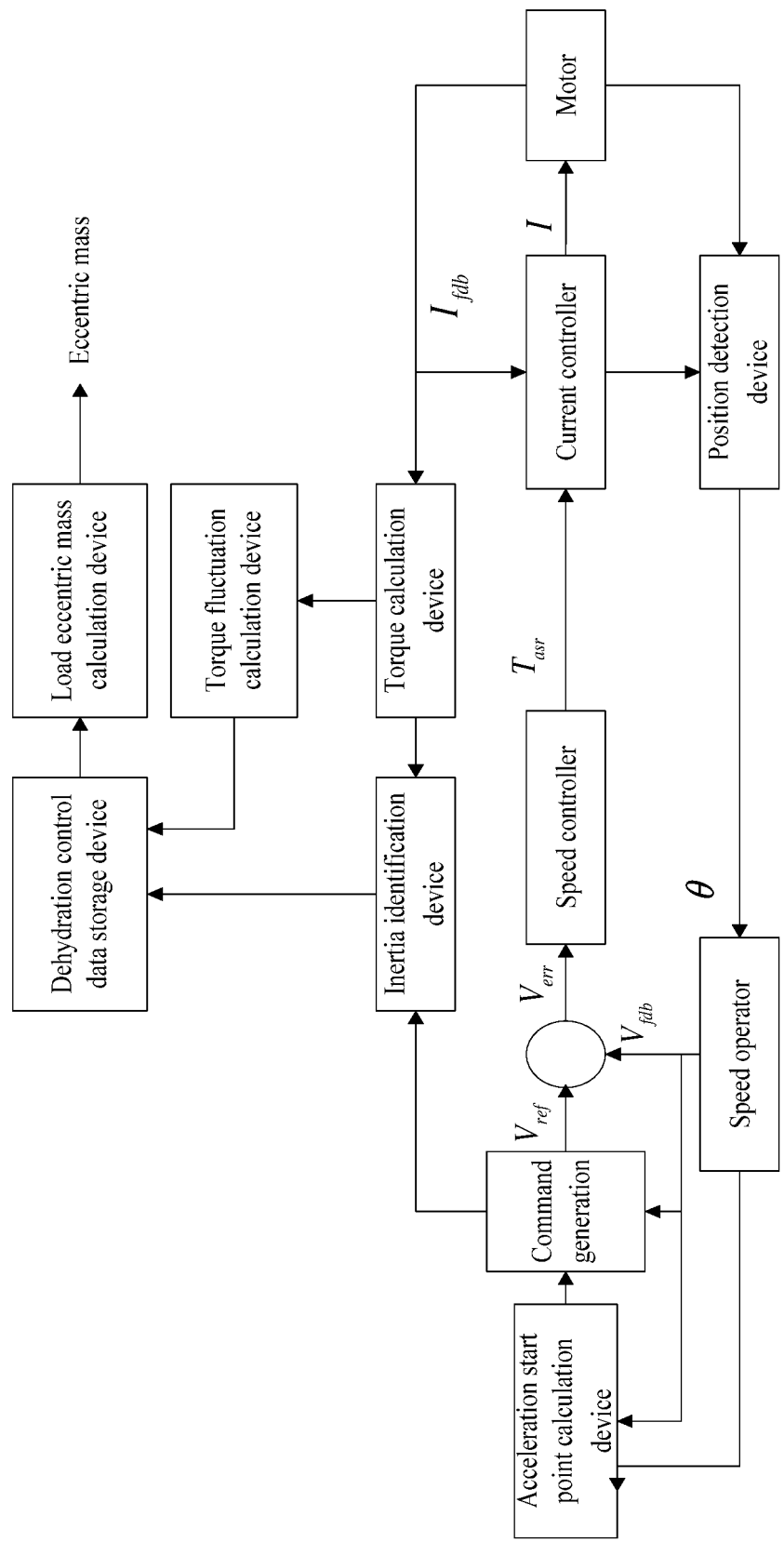
FIG. 8 shows a schematic block diagram illustrating eccentric mass calculation according to an embodiment of the present application.

FIG. 8 shows a schematic block diagram illustrating eccentric mass calculation according to an embodiment of the present application.

Figure 9:
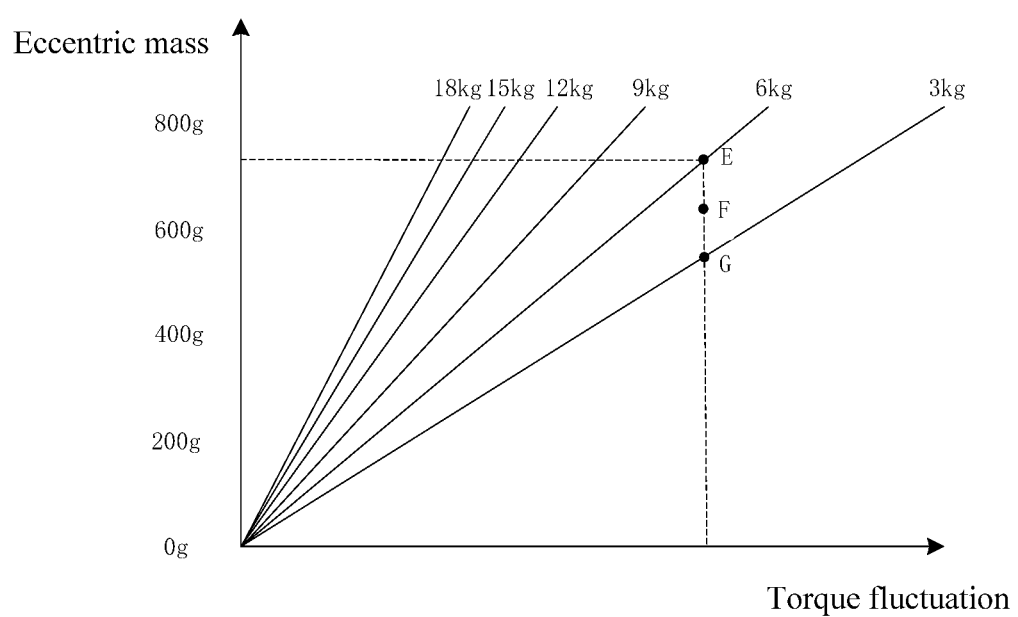
FIG. 9 shows curves of torque fluctuation corresponding to different load masses and eccentric masses.

FIG. 9 shows curves of torque fluctuation corresponding to different load masses and eccentric masses.

Figure 10:
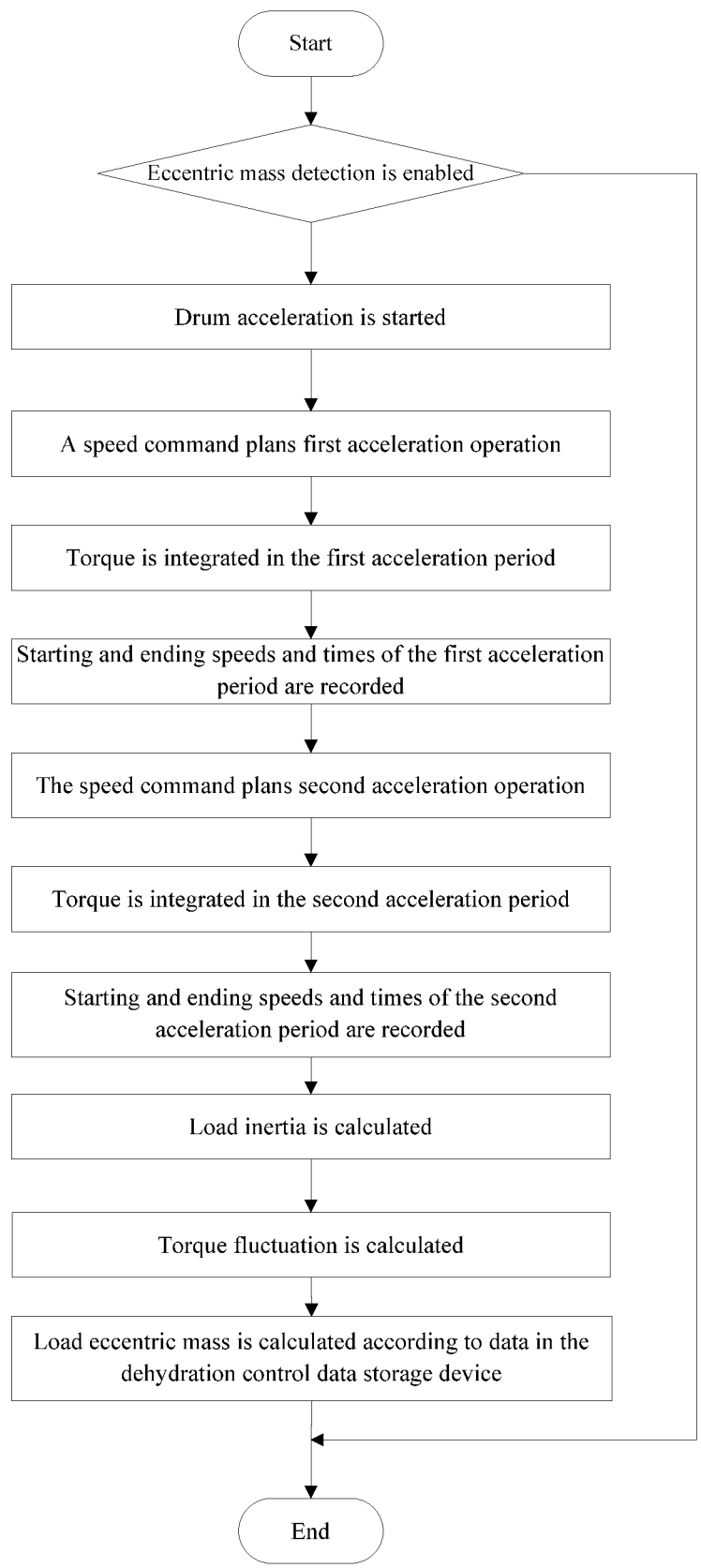
FIG. 10 shows a schematic flowchart illustrating eccentric mass calculation according to an embodiment of the present application.

FIG. 10 shows a schematic flowchart illustrating eccentric mass calculation according to an embodiment of the present application.

The principle derivation process for load inertia calculation of the clothing treatment device of the present application are as follows:

considering that the coefficient of viscosity B in the motion equation of the motor is generally small, when the coefficient of viscosity B is neglected, the motion equation of the motor is transformed into:

$$T_e - T_d - T_f = J\frac{d\omega}{dt}; \quad \text{Formula 1}$$

in the formula, $T_d$ is unbalance torque, which, taking a drum washing machine as an example, periodically changes along with the speed of the drum, and $T_f$ is friction torque.

As shown in FIG. 7, the electromagnetic torque of the drum spinning one cycle in the time interval of A-B is referred to as $T_{e1}$, and the electromagnetic torque of the drum spinning one cycle in the time interval of C-D is referred to as $T_{e2}$. Integrate both sides of Formula 1 in both A-B and C-D to obtain $$\int_A^B (T_{e1} - T_d - T_f) = J \int_A^B \frac{d\omega}{dt} dt; \qquad \text{Formula 2}$$

Further calculate to obtain:

$$\int_A^B T_{e1} dt - \int_A^B T_d dt - (t_B - t_A) T_f = J(\omega_B - \omega_A); \qquad \text{Formula 3}$$

in the formula, $$\int_A^B T_d dt = 0,$$

then Formula 3 is changed into:

$$\int_A^B T_{e1} dt - (t_B - t_A) T_f = J(\omega_B - \omega_A); \qquad \text{Formula 4}$$

in the formula, $t_A$ and $t_B$ are times at points A and B.
Similarly, calculate to obtain $$\int_C^D T_{e2} dt - (t_D - t_C) T_f = J(\omega_D - \omega_C); \qquad \text{Equation 5}$$

The friction torque is unified to obtain:

$$\frac{t_B - t_A}{t_D - t_C} \int_C^D T_{e2} dt - (t_B - t_A) T_f = J \frac{t_B - t_A}{t_D - t_C} (\omega_D - \omega_C); \qquad \text{Formula 6}$$

Subtract Formula 4 from Formula 6 to obtain the load inertia:

$$J = \frac{\frac{t_B - t_A}{t_D - t_C} \int_C^D T_{e2} dt - \int_A^B T_{e1} dt}{\frac{t_B - t_A}{t_D - t_C} (\omega_D - \omega_C) - (\omega_B - \omega_A)}; \qquad \text{Formula 7}$$

FIG. 8 shows a block diagram illustrating a control algorithm for load inertia calculation.

FIG. 9 shows a schematic flowchart of an embodiment of the present application.

Based on the Formula 7, the load mass of the drum washing machine can be obtained based on a correspondence between the load inertia and the load mass, and in practical use, the drum washing machine operates according to a preset speed curve, and considering that the speed is a fixed value, then the load mass can be represented by:

$$L = \frac{t_B - t_A}{t_D - t_C} \int_C^D T_{e2} dt - \int_A^B T_{e1} dt; \qquad \text{Formula 8}$$

As shown in FIG. 8, the block diagram of the control algorithm comprises a load inertia identification device, a torque fluctuation detection device, a dehydration control data storage device and a load eccentric mass calculation device. The function of accurately calculating the load eccentric mass in the acceleration process of the drum washing machine is achieved. The load inertia identification device acquires torques, speeds and time lengths of two acceleration periods with different accelerations in the acceleration process and calculates the current load inertia value; the torque fluctuation detection device detects a torque fluctuation value in a specific interval while the inertia detection is carried out; the dehydration control data storage device stores a two-dimensional data table of inertia values and torque fluctuation values of the drum washing machine with different inertias and eccentric masses; and the load eccentric mass calculation device calculates the eccentric mass under the current load through two-dimensional linear fitting by using the two-dimensional data table in the dehydration control data storage device according to the inertia value output by the load inertia identification device and the torque fluctuation value output by the torque fluctuation detection device. When the eccentric mass is smaller than a preset mass threshold value, the drum is controlled to accelerate to dehydrate the clothing in the drum, and when the eccentric mass is greater than the preset mass threshold value, the drum is controlled to carry out scattering operation on the clothing to redistribute the load. Therefore, the present application allows more accurate determination of the eccentric mass as compared with the prior art, and consumes less time.

For example, the load inertia identification device (inertia identification device) is used for detecting the inertia of the drum and clothing in the drum; the torque fluctuation detection device (torque fluctuation calculation device) is used for detecting the torque fluctuation of the motor; the dehydration control data storage device is used for storing the two-dimensional data table of inertia and torque fluctuation; and the load eccentric mass calculation device is used for calculating the load eccentric mass. In the acceleration process of the drum washing machine, the load inertia and the torque fluctuation are detected in real time so as to calculate the eccentric state of the load. For example, the data recorded in the dehydration control data storage device is preset data and is used as parameters of the load eccentric mass calculation device during operation of the machine, and the load eccentric mass calculation device detects the load inertia and torque fluctuation in real time and queries the data in the dehydration control data storage device to determine a current interval where the load eccentric mass is located and to obtain the load eccentric mass by using two-dimensional linear fitting calculation; further, FIG. 9 shows curves of torque fluctuation corresponding to different load masses and eccentric masses, and the current interval is determined according to the coordinate position of the load inertia in the figure; taking a mass of 4 kg as an example, if a first torque fluctuation is detected, a matched coordinate point E is found in a fitting line of a first load inertia corresponding to 6 kg, and a matched coordinate point G is also found in a fitting line of the first load inertia corresponding to 3 kg, then, the first load inertia corresponding to 4 kg and a coordinate point F corresponding to the first torque fluctuation can be determined according to the coordinate point E and the coordinate point G, and a corresponding ordinate value (i.e. the eccentric mass corresponding to the first torque fluctuation) is determined according to the coordinate point F. The operations for calculating the load eccentric mass are shown in FIG. 10.

Figure 11:
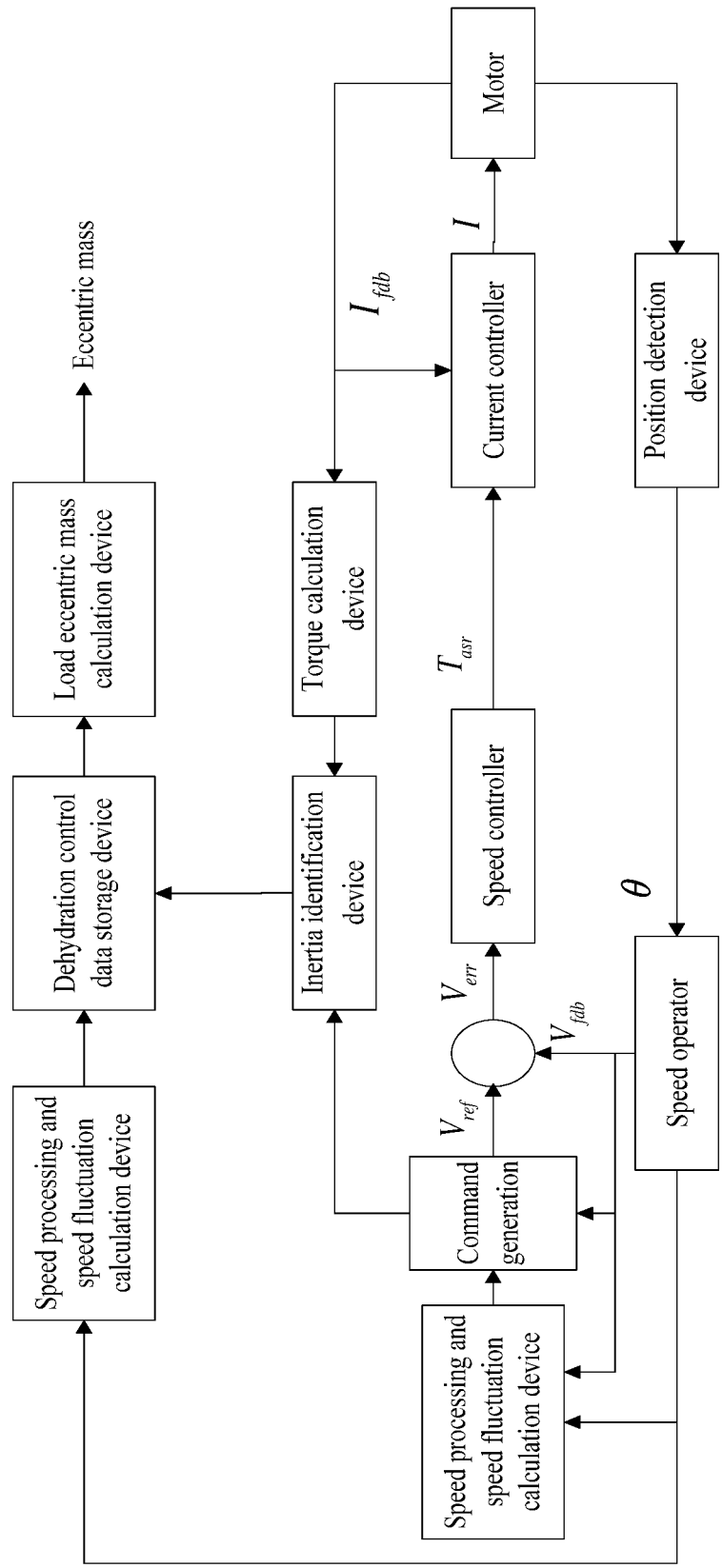
FIG. 11 shows a schematic block diagram illustrating eccentric mass calculation according to another embodiment of the present application.

FIG. 11 shows a schematic block diagram illustrating eccentric mass calculation according to another embodiment of the present application.

Figure 12:
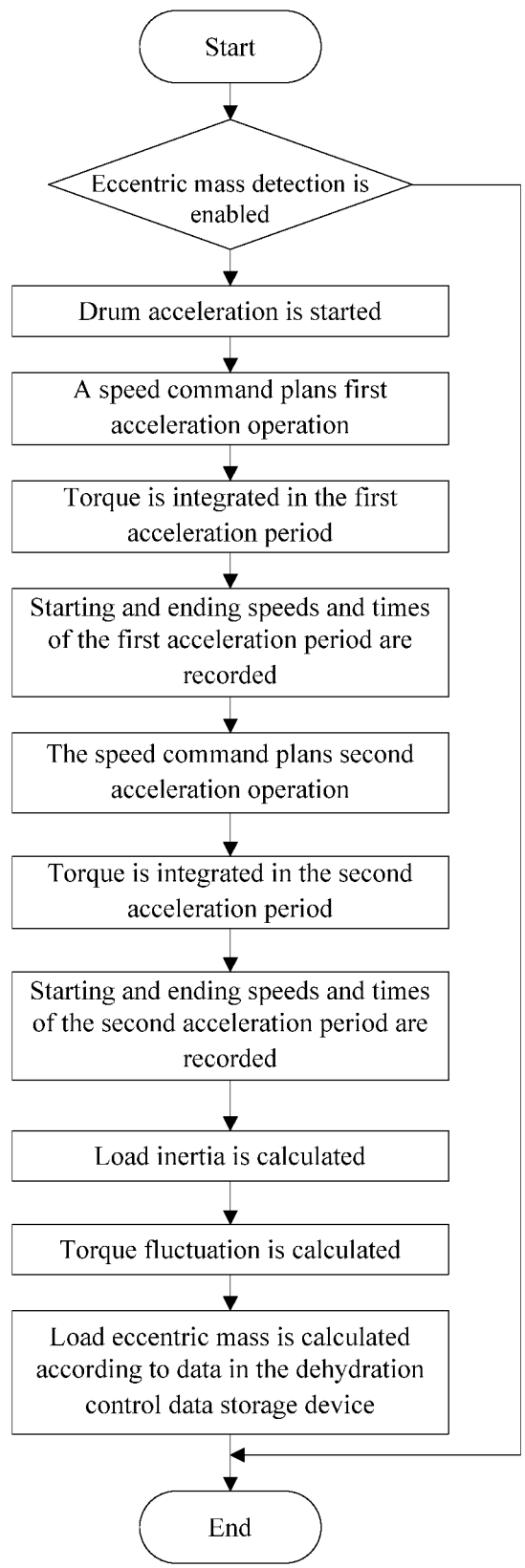
FIG. 12 shows a schematic flowchart illustrating eccentric mass calculation according to another embodiment of the present application.

FIG. 12 shows a schematic flowchart illustrating eccentric mass calculation according to another embodiment of the present application.

Figure 13:
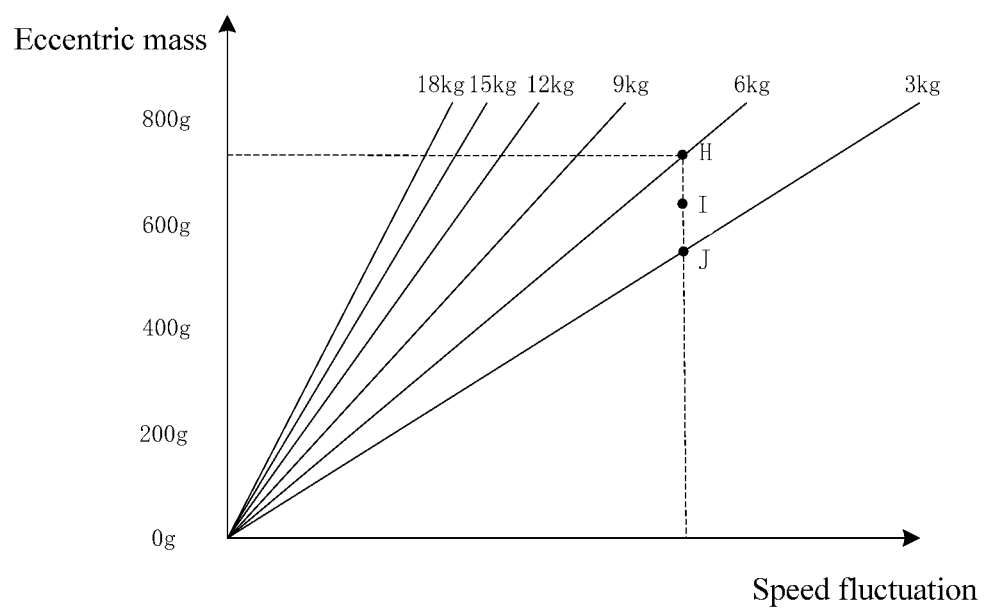
FIG. 13 shows a schematic diagram of curves of speed fluctuation corresponding to different load masses and eccentric masses according to an embodiment of the present application.

FIG. 13 shows a schematic diagram of curves of speed fluctuation corresponding to different load masses and eccentric masses according to an embodiment of the present application.

Figure 14:
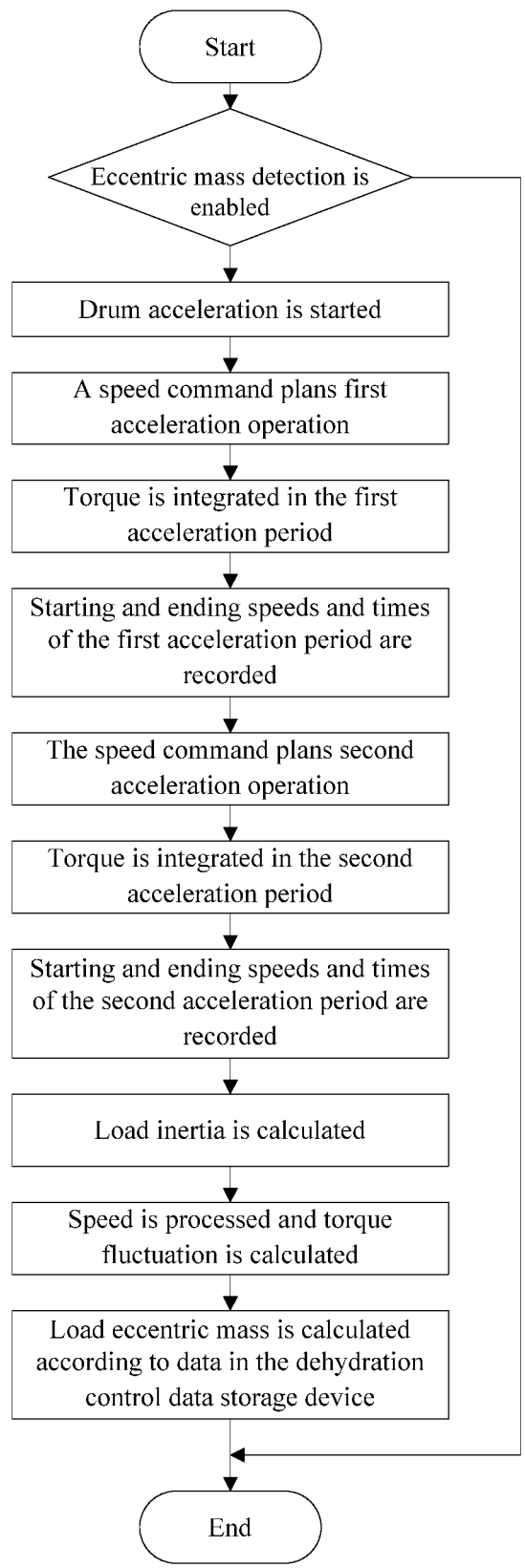
FIG. 14 shows a schematic flowchart illustrating eccentric mass calculation according to yet another embodiment of the present application.

FIG. 14 shows a schematic flowchart illustrating eccentric mass calculation according to yet another embodiment of the present application.

Referring to FIGS. 11 to 13 and FIG. 14, in an embodiment of the present application, as shown in FIG. 11, a load inertia identification device, a speed processing device, a speed fluctuation detection device, a dehydration control data storage device, and a load eccentric mass calculation device are included. The function of accurately calculating the load eccentric mass in the acceleration process of the drum washing machine is achieved. The load inertia identification device acquires torques, speeds and time lengths of two acceleration periods with different accelerations in the acceleration process and calculates the current load inertia value; the speed processing device carries out operation processing on the speed of the motor to obtain speed information ready to use; the speed fluctuation detection device detects a speed fluctuation value in a specific interval while the inertia detection is carried out; the dehydration control data storage device stores a two-dimensional data table of inertia values and speed fluctuation values of the drum washing machine with different inertias and eccentric masses; and the load eccentric mass calculation device calculates the eccentric mass under the current load through two-dimensional linear fitting by using the two-dimensional data table in the dehydration control data storage device according to the inertia value output by the load inertia identification device and the speed fluctuation value output by the speed fluctuation detection device. When the eccentric mass is smaller than a preset mass threshold value, the drum is controlled to accelerate to dehydrate the clothing in the drum, and when the eccentric mass is greater than the preset quality threshold value, the drum is controlled to carry out scattering operation on the clothing to redistribute the load. Therefore, the present application allows more accurate determination of the eccentric mass as compared with the prior art, and consumes less time.

For example, the load inertia identification device (inertia identification device) is used for detecting the inertia of the drum and clothing in the drum; the speed processing device (speed processing and speed fluctuation calculation device) is used for carrying out mathematical processing on the speed of the motor; the speed fluctuation detection device (speed processing and speed fluctuation calculation device) is used for detecting the speed fluctuation of the motor; the dehydration control data storage device is used for storing the two-dimensional data table of inertia and speed fluctuation; and the load eccentric mass calculation device is used for calculating the load eccentric mass. In the acceleration process of the drum washing machine, the load inertia and the speed fluctuation are detected in real time so as to calculate the eccentric state of the load. For example, the data recorded in the dehydration control data storage device is preset data, and is used as parameters of the load eccentric mass calculation device during operation of the machine. The data in the dehydration control data storage device is two-dimensional data of load inertia and speed fluctuation corresponding to the load eccentric mass, the load inertia and the speed fluctuation are detected with preset load mass and eccentric mass and are recorded in the dehydration control data storage device, wherein the preset load mass and eccentric mass are selected according to the maximum allowable load of the currently used drum washing machine.

Based on the formula 7, the load mass of the drum washing machine can be obtained based on the correspondence between the load inertia and the load mass, and in practical use, the drum washing machine operates according to a preset speed curve, the rotation speed is considered as a fixed value; the speed processing and speed fluctuation calculation need to calculate the load speed fluctuation in the acceleration process, which requires the speed to be high enough during a preset time to ensure that the clothing are completely attached to the wall of the drum. As the motor is in the acceleration process, the speed information of the motor contains both the acceleration information and the speed fluctuation information, the speed fluctuation information needs to be extracted to be used for calculating the speed fluctuation.

Solution 1: the actual speed of the motor is subjected to high-pass filtering, and the selection of the filtering cut-off frequency is required to retain the speed fluctuation information under the current detection speed, and filter out the low-frequency acceleration information.

Solution 2: the speed command of the motor is subtracted from the actual speed of the motor to remove the acceleration information and retain the speed fluctuation information.

During the preset time, the position of the drum is detected, and processed speed information within one spinning circle of the drum is detected and recorded in which the maximum value and the minimum value are also recorded. Speed fluctuation=maximum value−minimum value.

Among others, in the acceleration process of the drum washing machine, the load eccentric mass calculation device detects the load inertia and the speed fluctuation in real time and queries data in the dehydration control data storage device to determine a current interval where the load eccentric mass is located and to obtain the load eccentric mass by using two-dimensional linear fitting calculation. For example, the load eccentric mass calculation device detects the load inertia and the speed fluctuation in real time, and then finds the curves of speed fluctuation corresponding to different load masses and eccentric masses, and the current interval is determined in FIG. 13 according to the load inertia. Taking a mass of 4 kg as an example, if a first speed fluctuation is detected, a matched coordinate point H is found in a fitting line of a first load inertia corresponding to 6 kg, and a matched coordinate point J is also found in a fitting line of the first load inertia corresponding to 3 kg, then, the first load inertia corresponding to 4 kg and a coordinate point I corresponding to the first speed fluctuation can be determined according to the coordinate point H and the coordinate point J, and a corresponding ordinate value (i.e. the eccentric mass corresponding to the first speed fluctuation) is determined according to the coordinate point I. The operations for calculating the load eccentric mass are shown in FIG. 14.

In the description of the present application, the term "a plurality of" refers to two or more, unless explicitly defined otherwise, the orientation or positional relationship indicated by the terms "upper", "lower", and the like is based on the orientation or positional relationship shown in the drawings, merely for convenience in describing the present application and simplifying the description, and does not indicate or imply that the referenced device or part must have a particular orientation, or constructed and operative in a particular orientation, and therefore should not be construed as limiting the present application; the terms "connected", "mounted", "fixed", and the like are to be construed broadly, e.g., "connected" may be fixedly connected, or may be detachably connected, or integrally connected; they may be connected directly or indirectly through an intermediary. The specific meaning of the above terms in this application will be understood by those of ordinary skill in the art, as the case may be.

In the description of the present application, the description of the terms "one embodiment", "some embodiments", "particular embodiments", etc., means that particular features, structures, materials, or characteristics described in connection with the embodiment or example is included in at least one embodiment or example of the present application. In this application, the schematic representation of the above terms does not necessarily refer to the same embodiment or example. Furthermore, the particular features, structures, materials, or characteristics described may be combined in any suitable manner in any one or more embodiments or examples.

The foregoing is merely a preferred embodiment of the disclosure and is not intended to limit the disclosure, as various modifications and changes therein will occur to those skilled in the art. Any modifications, equivalents, improvements, etc. that come within the spirit and principles of this application are intended to be included within the scope of this application.

What is claimed is:

1. An operation control method for a clothing treatment device, wherein the clothing treatment device comprises a drum and a motor configured to drive the drum to spin, the operation control method comprising:
   controlling the motor to perform a first operation process according to a first acceleration, and integrating electromagnetic torques of the motor during the first operation process to obtain a first integration result;
   controlling the motor to perform a second operation process according to a second acceleration, and integrating electromagnetic torques of the motor during the second operation process to obtain a second integration result;
   acquiring operation parameters of the clothing treatment device, wherein the operation parameters comprise a first operation period of the first operation process and rotation speed values of the motor at two end points of the first operation process, and a second operation period of the second operation process and rotation speed values of the motor at two end points of the second operation process;
   calculating load inertia of the motor based on the first integration result, the second integration result and the operation parameters and setting the load inertia of the motor as the load inertia of the drum;
   obtaining a fluctuation parameter of the motor;
   obtaining load eccentric mass of the clothing treatment device based on the load inertia, the fluctuation parameter, and predetermined relationship data, wherein the predetermined relationship data is calculated based on pre-stored load inertia, pre-stored fluctuation parameters, and pre-stored load eccentric mass; and
   controlling the clothing treatment device according to the load eccentric mass to redistribute a load,
   wherein the fluctuation parameter comprises a torque fluctuation parameter.

2. The operation control method for the clothing treatment device according to claim 1,
   wherein the calculating the load inertia comprises calculating the load inertia according to the following formula:

$$J = \frac{\frac{t_B - t_A}{t_D - t_C} \int_C^D T_{e2} dt - \int_A^B T_{e1} dt}{\frac{t_B - t_A}{t_D - t_C}(\omega_D - \omega_C) - (\omega_B - \omega_A)}$$

wherein
J is the load inertia; and
$t_A$, $t_B$, $t_C$, and $t_D$ are starting and ending times of the first operation period and the second operation period, respectively;
$\omega_A$, $\omega_B$, $\omega_C$, and $\omega_D$ are the rotation speed values at two end points of the first operation process and the second operation process, respectively; and $$\int_A^B T_{e1} dt \text{ and } \int_C^D T_{e2} dt$$

are the first integration result and the second integration result, respectively.

3. The operation control method for the clothing treatment device according to claim 1,
   wherein the torque fluctuation parameter is obtained by:
      detecting torque values of the motor in real time during the first operation process or the second operation process;
      obtaining a maximum torque value and a minimum torque value; and
      obtaining the torque fluctuation parameter based on the maximum torque value and the minimum torque value.

4. The operation control method for the clothing treatment device according to claim 1, wherein:
   the first operation period is of a first integral multiple of a spinning cycle of the drum of the clothing treatment device and the second operation period is of a second integral multiple of the spinning cycle; and
   the first integral multiple is equal to the second integral multiple.

5. The operation control method for the clothing treatment device according to claim 1,
   wherein the obtaining the load eccentric mass of the clothing treatment device comprises:
      determining a range of load inertia according to the load inertia and two fitted curves corresponding to two end points of the range of load inertia, based on the predetermined relationship data;

determining coordinate points of the two fitted curves based on the torque fluctuation parameter, such that the coordinate points correlate with the torque fluctuation parameter; and determining the load eccentric mass of the clothing treatment device based on the coordinate points.

6. The operation control method for the clothing treatment device according to claim 1, further comprises:
inletting water into the drum; and
controlling inlet water amount of the clothing treatment device according to the load eccentric mass to prevent noise generated by the clothing treatment device.

7. An operation control system for a clothing treatment device, wherein the clothing treatment device comprises a drum and a motor configured to drive the drum to spin, the operation control system comprising:
a memory for storing a computer program; and
a processor being configured to execute the computer program to:
control the motor to perform a first operation process according to a first acceleration, and integrate electromagnetic torques of the motor during the first operation process to obtain a first integration result;
control the motor to perform a second operation process according to a second acceleration, and integrate electromagnetic torques of the motor during the second operation process to obtain a second integration result;
acquire operation parameters of the clothing treatment device, wherein the operation parameters comprise a first operation period of the first operation process and rotation speed values of the motor at two end points of the first operation process, and a second operation period of the second operation process and rotation speed values of the motor at two end points of the second operation process;
calculate load inertia of the motor based on the first integration result, the second integration result and the operation parameters and setting the load inertia of the motor as the load inertia of the drum;
obtain a fluctuation parameter of the motor;
obtain load eccentric mass of the clothing treatment device based on the load inertia, the fluctuation parameter, and predetermined relationship data, wherein the predetermined relationship data is calculated based on pre-stored load inertia, pre-stored fluctuation parameters, and pre-stored load eccentric mass; and
control the clothing treatment device according to the load eccentric mass to redistribute a load,
wherein the fluctuation parameter comprises a torque fluctuation parameter.

8. The operation control system for the clothing treatment device according to claim 7,
wherein the processor is further configured to execute the computer program to obtain the torque fluctuation parameter by:
detecting torque values of the motor in real time during the first operation process or the second operation process;
obtaining a maximum torque value and a minimum torque value; and
obtaining the torque fluctuation parameter based on the maximum torque value and the minimum torque value.

9. The operation control system for the clothing treatment device according to claim 7,
wherein the processor is further configured to execute the computer program to obtain the load eccentric mass of the clothing treatment device by:
determining a range of load inertia according to the load inertia and two fitted curves corresponding to two end points of the range of load inertia, based on the predetermined relationship data;
determining coordinate points of the two fitted curves based on the torque fluctuation parameter, such that the coordinate points correlate with the torque fluctuation parameter; and
determining the load eccentric mass of the clothing treatment device based on the coordinate points.

10. The operation control system for the clothing treatment device according to claim 7,
wherein the processor is further configured to:
inlet water into the drum; and
execute the computer program to control inlet water amount of the clothing treatment device according to the load eccentric mass to prevent noise generated by the clothing treatment device.

11. A clothing treatment device comprising the operation control system for the clothing treatment device according to claim 7.

12. A non-transitory computer-readable storage medium having stored thereon a computer program, wherein the computer program, when executed by a processor, causes the processor to implement an operation control method for a clothing treatment device, wherein the clothing treatment device comprises a drum and a motor configured to drive the drum to spin, the operation control method comprising:
controlling the motor to perform a first operation process according to a first acceleration, and integrating electromagnetic torques of the motor during the first operation process to obtain a first integration result;
controlling the motor to perform a second operation process according to a second acceleration, and integrating electromagnetic torques of the motor during the second operation process to obtain a second integration result;
acquiring operation parameters of the clothing treatment device, wherein the operation parameters comprise a first operation period of the first operation process and rotation speed values of the motor at two end points of the first operation process, and a second operation period of the second operation process and rotation speed values of the motor at two end points of the second operation process;
calculating load inertia of the motor based on the first integration result, the second integration result and the operation parameters and setting the load inertia of the motor as the load inertia of the drum;
obtaining a fluctuation parameter of the motor;
obtaining load eccentric mass of the clothing treatment device based on the load inertia, the fluctuation parameter, and predetermined relationship data, wherein the predetermined relationship data is calculated based on pre-stored load inertia, pre-stored fluctuation parameters, and pre-stored load eccentric mass; and
controlling the clothing treatment device according to the load eccentric mass to redistribute a load,
wherein the fluctuation parameter comprises a torque fluctuation parameter.

* * * * *